(12) United States Patent
Thang et al.

(10) Patent No.: US 10,362,130 B2
(45) Date of Patent: *Jul. 23, 2019

(54) APPARATUS AND METHOD FOR PROVIDING STREAMING CONTENTS

(71) Applicants: Electronics and Telecommunications Research Institute, Daejeon (KR); INDUSTRY-UNIVERSITY COOPERATION FOUNDATION KOREA AEROPSACE UNIVERSITY, Goyang-si, Gyeonggi-do (KR)

(72) Inventors: Truong Cong Thang, Daejeon (KR); Jin Young Lee, Daejeon (KR); Seong Jun Bae, Daejeon (KR); Jung Won Kang, Daejeon (KR); Soon Heung Jung, Daejeon (KR); Sang Taick Park, Daejeon (KR); Won Ryu, Daejeon (KR); Jae Gon Kim, Goyang-si (KR)

(73) Assignee: IDEAHUB INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/069,443

(22) Filed: Mar. 14, 2016

(65) Prior Publication Data

US 2016/0198013 A1    Jul. 7, 2016

Related U.S. Application Data

(63) Continuation of application No. 13/811,376, filed as application No. PCT/KR2011/005357 on Jul. 20, 2011, now Pat. No. 9,325,558.

(Continued)

(30) Foreign Application Priority Data

Jul. 19, 2011    (KR) ........................ 10-2011-0071671

(51) Int. Cl.
*G06F 15/16*        (2006.01)
*H04L 29/08*       (2006.01)
(Continued)

(52) U.S. Cl.
CPC .... *H04L 67/2804* (2013.01); *H04L 29/06027* (2013.01); *H04L 47/30* (2013.01);
(Continued)

(58) Field of Classification Search
CPC ........... H04N 21/2401; H04N 21/2353; H04N 21/23805; H04N 21/44004;
(Continued)

(56) References Cited

U.S. PATENT DOCUMENTS 7,512,665 B1    3/2009  Cragun
7,552,228 B2    6/2009  Parasnis et al.
(Continued)

FOREIGN PATENT DOCUMENTS

EP    1302869 A1    4/2003
JP    2005020588 A   1/2005
(Continued)

OTHER PUBLICATIONS

"3GPP TS 26.cde V1.0.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10)", Aug. 2010, Valbonne, France.
(Continued)

*Primary Examiner* — Zarni Maung
(74) *Attorney, Agent, or Firm* — William Park & Associates Ltd.

(57) ABSTRACT

A method and apparatus for an adaptive Hypertext Transfer Protocol (HTTP) streaming service using metadata of content are provided. The metadata may include a minBuffer-
(Continued)

Time attribute indicating a minimum amount of initially buffered media content. A terminal may receive content from a server before playback of the content, and may buffer the content by at least the minimum amount. The metadata may include a range attribute that designates a range of a target indicated by a Uniform Resource Locator (URL). The terminal may receive bytes designated by the range attribute from the URL, and may play back the content using the received bytes.

6 Claims, 6 Drawing Sheets

Related U.S. Application Data

(60) Provisional application No. 61/434,036, filed on Jan. 19, 2011, provisional application No. 61/417,931, filed on Nov. 30, 2010, provisional application No. 61/414,462, filed on Nov. 17, 2010, provisional application No. 61/405,674, filed on Oct. 22, 2010, provisional application No. 61/390,328, filed on Oct. 6, 2010, provisional application No. 61/380,277, filed on Sep. 6, 2010, provisional application No. 61/375,262, filed on Aug. 20, 2010, provisional application No. 61/366,203, filed on Jul. 21, 2010, provisional application No. 61/365,860, filed on Jul. 20, 2010.

(51) Int. Cl.
| | |
|---|---|
| H04L 29/06 | (2006.01) |
| H04N 21/24 | (2011.01) |
| H04N 21/44 | (2011.01) |
| H04N 21/6543 | (2011.01) |
| H04N 21/6547 | (2011.01) |
| H04L 12/835 | (2013.01) |
| G06F 12/00 | (2006.01) |
| H04N 21/235 | (2011.01) |
| H04N 21/238 | (2011.01) |

(52) U.S. Cl.
CPC ........ *H04L 65/4092* (2013.01); *H04L 65/602* (2013.01); *H04L 65/604* (2013.01); *H04L 65/608* (2013.01); *H04L 65/80* (2013.01); *H04N 21/2401* (2013.01); *H04N 21/2402* (2013.01); *H04N 21/44004* (2013.01); *H04N 21/6543* (2013.01); *H04N 21/6547* (2013.01); *H04N 21/2353* (2013.01); *H04N 21/23805* (2013.01)

(58) Field of Classification Search
CPC ........... H04N 21/6543; H04N 21/2402; H04N 21/6547; H04N 21/23439; H04N 21/235; H04N 21/2358; H04N 21/236; H04N 21/2381; H04N 21/26258; H04N 21/2662; H04N 21/43
See application file for complete search history.

(56) References Cited

U.S. PATENT DOCUMENTS

| | | | |
|---|---|---|---|
| 7,624,337 B2 | 11/2009 | Sull et al. | |
| 7,725,829 B1 | 5/2010 | Wong et al. | |
| 7,823,055 B2 | 10/2010 | Sull et al. | |
| 8,201,204 B2 | 6/2012 | Connery et al. | |
| 8,209,609 B2 | 6/2012 | Dunton et al. | |
| 8,230,343 B2 | 7/2012 | Logan et al. | |
| 8,365,271 B2 | 1/2013 | Blum et al. | |
| 8,468,145 B2 | 6/2013 | Fedorynski et al. | |
| 8,533,310 B2 | 9/2013 | Huang et al. | |
| 8,635,360 B2 | 1/2014 | Brase et al. | |
| 8,645,562 B2 | 2/2014 | Thang et al. | |
| 8,909,805 B2 | 12/2014 | Thang et al. | |
| 9,264,069 B2 | 2/2016 | Watson et al. | |
| 9,281,847 B2 | 3/2016 | Stockhammer et al. | |
| 9,319,448 B2 | 4/2016 | Chen et al. | |
| 9,325,558 B2* | 4/2016 | Thang ................. H04L 65/4092 |
| 9,467,493 B2 | 10/2016 | Thang et al. | |
| 2002/0105951 A1 | 8/2002 | Hannuksela et al. | |
| 2003/0093790 A1 | 5/2003 | Logan et al. | |
| 2003/0236912 A1 | 12/2003 | Klemets et al. | |
| 2004/0064577 A1 | 4/2004 | Dahlin et al. | |
| 2004/0208120 A1 | 10/2004 | Shenoi | |
| 2005/0005308 A1 | 1/2005 | Logan et al. | |
| 2005/0076136 A1 | 4/2005 | Cho et al. | |
| 2005/0102371 A1 | 5/2005 | Aksu | |
| 2005/0193408 A1 | 9/2005 | Sull et al. | |
| 2005/0193425 A1 | 9/2005 | Sull et al. | |
| 2005/0203927 A1 | 9/2005 | Sull et al. | |
| 2005/0204385 A1 | 9/2005 | Sull et al. | |
| 2005/0273514 A1 | 12/2005 | Milkey et al. | |
| 2006/0109856 A1 | 5/2006 | Deshpande | |
| 2006/0218143 A1 | 9/2006 | Najork | |
| 2006/0235883 A1 | 10/2006 | Krebs | |
| 2006/0251093 A1 | 11/2006 | Curcio et al. | |
| 2007/0003251 A1 | 1/2007 | Chung et al. | |
| 2007/0033170 A1 | 2/2007 | Sull et al. | |
| 2007/0033292 A1 | 2/2007 | Sull et al. | |
| 2007/0033515 A1 | 2/2007 | Sull et al. | |
| 2007/0033521 A1 | 2/2007 | Sull et al. | |
| 2007/0033533 A1 | 2/2007 | Sull | |
| 2007/0038612 A1 | 2/2007 | Sull et al. | |
| 2007/0044010 A1 | 2/2007 | Sull et al. | |
| 2008/0034424 A1 | 2/2008 | Overcash et al. | |
| 2008/0050096 A1 | 2/2008 | Ryu | |
| 2008/0126943 A1 | 5/2008 | Parasnis et al. | |
| 2008/0155602 A1 | 6/2008 | Collet et al. | |
| 2008/0172441 A1 | 7/2008 | Speicher et al. | |
| 2008/0222244 A1 | 9/2008 | Huang et al. | |
| 2008/0313227 A1 | 12/2008 | Shafton et al. | |
| 2009/0157859 A1 | 6/2009 | Morris | |
| 2009/0185040 A1 | 7/2009 | Yang et al. | |
| 2009/0217354 A1 | 8/2009 | Blum | |
| 2009/0300204 A1 | 12/2009 | Zhang et al. | |
| 2010/0011274 A1* | 1/2010 | Stockhammer ...  H03M 13/2789 714/752 |
| 2010/0107090 A1 | 4/2010 | Hearst et al. | |
| 2010/0169303 A1 | 7/2010 | Biderman et al. | |
| 2010/0174823 A1 | 7/2010 | Huang | |
| 2010/0217887 A1* | 8/2010 | Bouazizi ............... H04L 1/0041 709/231 |
| 2010/0235472 A1 | 9/2010 | Sood et al. | |
| 2010/0235528 A1 | 9/2010 | Bocharov et al. | |
| 2010/0262618 A1 | 10/2010 | Hedinsson et al. | |
| 2011/0080940 A1 | 4/2011 | Bocharov et al. | |
| 2011/0093492 A1 | 4/2011 | Sull et al. | |
| 2011/0096828 A1 | 4/2011 | Chen et al. | |
| 2011/0119394 A1 | 5/2011 | Wang et al. | |
| 2011/0185058 A1 | 7/2011 | Priddle et al. | |
| 2011/0231519 A1 | 9/2011 | Luby et al. | |
| 2011/0231569 A1 | 9/2011 | Luby et al. | |
| 2011/0238789 A1 | 9/2011 | Luby et al. | |
| 2011/0239078 A1 | 9/2011 | Luby et al. | |
| 2011/0302618 A1 | 12/2011 | Odlund et al. | |
| 2011/0307545 A1 | 12/2011 | Bouazizi | |
| 2012/0013746 A1 | 1/2012 | Chen et al. | |
| 2012/0016965 A1* | 1/2012 | Chen ................. H04N 21/23439 709/219 |
| 2012/0023155 A1 | 1/2012 | Myers et al. | |
| 2012/0023249 A1 | 1/2012 | Chen et al. | |
| 2012/0023251 A1 | 1/2012 | Pyle et al. | |
| 2012/0042050 A1 | 2/2012 | Chen et al. | |
| 2012/0042091 A1 | 2/2012 | McCarthy et al. | |
| 2012/0124179 A1 | 5/2012 | Cappio et al. | |
| 2012/0185570 A1 | 7/2012 | Bouazizi et al. | |
| 2012/0233345 A1 | 9/2012 | Hannuksela | |
| 2012/0284371 A1 | 11/2012 | Begen et al. | |
| 2012/0317305 A1 | 12/2012 | Einarsson et al. | |

(56) References Cited

U.S. PATENT DOCUMENTS

| | | |
|---|---|---|
| 2013/0007223 A1* | 1/2013 | Luby ............... H04N 21/23106 709/219 |
| 2013/0042100 A1 | 2/2013 | Bouazizi et al. |
| 2013/0117413 A1 | 5/2013 | Kaneko |
| 2013/0182643 A1 | 7/2013 | Pazos et al. |
| 2013/0191550 A1 | 7/2013 | Hannuksela |
| 2013/0254631 A1 | 9/2013 | Luby et al. |
| 2013/0262567 A1 | 10/2013 | Walker et al. |
| 2013/0286879 A1 | 10/2013 | Elarabawy et al. |
| 2013/0290492 A1 | 10/2013 | Elarabawy et al. |
| 2013/0298170 A1 | 11/2013 | Elarabawy et al. |
| 2014/0137168 A1 | 5/2014 | Takahashi et al. |
| 2014/0258861 A1 | 9/2014 | Baldwin |
| 2015/0172348 A1 | 6/2015 | Lohmar et al. |
| 2015/0280965 A1 | 10/2015 | Kervadec |
| 2016/0165210 A1 | 6/2016 | Lee et al. |
| 2018/0159909 A1 | 6/2018 | Huang |

FOREIGN PATENT DOCUMENTS

| | | |
|---|---|---|
| JP | 2005071318 A | 3/2005 |
| JP | 2008259001 A | 10/2008 |
| KR | 1020050000490 A | 1/2005 |
| KR | 1020050055820 A | 6/2005 |
| KR | 1020050075633 A | 7/2005 |
| KR | 1020080108568 A | 12/2008 |
| WO | 03073768 A1 | 9/2003 |
| WO | 2011038032 A2 | 3/2011 |

OTHER PUBLICATIONS

"Universal Mobile Telecommunications System; LTE; Transparent end-to-end Packet-switched Streaming Service (PSS); Protocols and codecs (3GPP TS 26.234 version 9.3.0 Release 9)," ETSI TS 126 234, V9.3.0, Jun. 2010, pp. 1-184, ETSI, France.

"Use cases for Rel-10 Adaptive HTTP Streaming", 3GPP TSG-SA4#60, Qualcomm Incorporated, Aug. 16-20, 2010, Erlangen, Germany.

Thomas Stockhammer et al., "Information technology—MPEG systems technologies—Part 6: Dynamic adaptive streaming over HTTP (DASH)", International Organization for Standardization, ISO/IEC JTC1/SC29/WG11 Coding of Moving Pictures and Audio, ISO/IEC CD 23001-6, Oct. 15, 2010, Guangzhou, China.

Ying Chen et al., "Response to the CfP on HTTP Streaming: Adaptive Video Streaming based on AVC," International Drganisation for Standardisation, Jul. 2010, pp1-20, ISO/IEC JTC1/SC29/WG11, MPEG2010/MI7909, Qualcomm Incorporated, Geneva, Switzerland.

* cited by examiner

APPARATUS AND METHOD FOR PROVIDING STREAMING CONTENTS

TECHNICAL FIELD

The present invention relates to a technology for providing streaming content, and more particularly, to an apparatus and method for providing media content using adaptive streaming.

BACKGROUND ART

Streaming is one of schemes for transmitting and playing back multimedia content such as sounds, moving images, and the like. A client may play back content while receiving the content through the streaming.

An adaptive streaming service refers to providing a streaming service employing a communication scheme with a request of a client and a response of a server in response to the request.

The client may request a media sequence suitable for an environment of the client (for example, a transmission channel of the client), using the adaptive streaming service. The server may provide a media sequence matched to the request of the client among media sequences with various qualities that are included in the server.

The adaptive streaming service may be provided based on various protocols.

A Hypertext Transfer Protocol (HTTP) adaptive streaming service refers to an adaptive streaming service provided based on an HTTP protocol. A client of the HTTP adaptive streaming service may receive content from a server using the HTTP protocol, and may transmit a request associated with a streaming service to the server.

DISCLOSURE OF INVENTION

Technical Goals

An aspect of the present invention provides an apparatus and method that may designate a minimum amount of initially buffered media during playback of content.

Another aspect of the present invention provides an apparatus and method that may receive bytes within a specific range from a target indicated by a Uniform Resource Locator (URL), and may play back content.

Technical Solutions

According to an aspect of the present invention, there is provided a method by which a client provides media content including one or more periods, the method including: receiving metadata of the media content from a server, the metadata including a minBufferTime attribute indicating a minimum amount of initially buffered media content that is required to ensure playout of the media content; receiving the media content from the server, and buffering the received media content by at least the minimum amount; and playing back the media content.

The metadata may be a Media Presentation Description (MPD) of the media content.

The minBufferTime attribute may indicate the minimum amount of the initially buffered media content that is required to ensure playout of the media content when the media content is continuously delivered at or above a value of a bandwidth attribute of the metadata.

Each of the periods may include one or more representations of the media content. Each of the representations may be a structured collection of one or more media components within a period.

The bandwidth attribute may be an attribute of each of the representations.

The bandwidth attribute may describe a minimum bandwidth of a hypothetical constant bitrate channel over which each of the representations are able to be continuously delivered after the client buffers each of the representations for at least minBufferTime.

Each of the representations may include one or more segments.

According to another aspect of the present invention, there is provided a terminal for providing media content including one or more periods, the terminal including: an access engine to receive metadata of the media content, to receive the media content from the server, and to buffer the received media content by at least a minimum amount indicated by a minBufferTime attribute, the metadata including the minBufferTime attribute indicating the minimum amount of initially buffered media content that is required to ensure playout of the media content; and a media engine to receive the media content from the access engine, and to play back the media content.

According to still another aspect of the present invention, there is provided a method by which a client provides media content including one or more periods, the method including: receiving metadata of the media content from a server, the metadata including a Uniform Resource Locator (URL) attribute and a range attribute; receiving bytes designated by the range attribute from a URL indicated by the URL attribute; and playing back the media content using the received bytes.

The bytes designated by the range attribute may designate segments of the media content.

The range attribute may indicate multiple byte ranges.

The bytes may be received by a partial HTTP GET command for the URL instructed by the byte range.

According to yet another aspect of the present invention, there is provided a terminal for providing media content including one or more periods, the terminal including: an access engine to receive metadata of the media content, and to receive bytes designated by a range attribute from a URL indicated by a URL attribute, the metadata including the URL attribute and the range attribute; and a media engine to play back the media content using the received bytes.

The bytes designated by the range attribute may designate segments of the media content.

The range attribute may indicate multiple byte ranges.

The bytes may be received by a partial HTTP GET command for the URL instructed by the byte range.

According to a further aspect of the present invention, there is provided a method by which a client processes content including one or more intervals, the method including: receiving metadata of an interval of the content from a server; processing the metadata and sending, to the server, a request for a fragment suitable for the interval based on the processed metadata; and receiving the fragment from the server.

The content may be content on demand, or live content.

The metadata may include general information, and the general information may include a general description of the content, and a general description of the interval.

The general description of the content may include at least one of a duration and a start time.

The metadata may include Quality of Service (QoS) information, and the QoS information may describe characteristics of each of alternatives of the content.

The characteristics may include at least one of a bitrate, a resolution, and a quality.

Each of the alternatives may be physical, or virtual.

The fragment may be selected based on information of the alternatives.

The metadata may include mapping information, and the mapping information may describe locations to retrieve the content.

The metadata may include content-level information, and interval-level information, and all computations for deciding alternatives and resolving locations may be performed by the server.

The request may define an order value of the fragment in the interval, and a start time of the fragment in the interval.

The metadata may include content-level information, interval-level information, and QoS information, and all computations for deciding alternatives and resolving locations may be distributed and performed by the client and the server.

The request may include one of an order value of an alternative that appears in the QoS information based on the order value, values of adaptation operators that appear in the QoS information, and values of resources that appear in the QoS information.

The adaptation operators may include at least one of a number of scalable audio layers to be discarded, a number of temporal layers of a scalable video to be discarded, a number of spatial layers of a scalable video to be discarded, a number of quality layers of a scalable video to be discarded, and a number of priority layers of a scalable video to be discarded.

A type of the resources may include at least one of an average bitrate of the alternative, a vertical resolution of the alternative, a horizontal resolution of the alternative, and a frame rate of the alternative.

The metadata may include content-level information, interval-level information, QoS information, and mapping information, and all computations for deciding alternatives and resolving locations may be performed by the client.

The request may include at least one of a parameter for Moving Picture Experts Group-2 Transport Stream (MPEG-2 TS) boundary, a parameter for International Organization for Standardization (ISO) media file boundary, and parameters for a file considered as a raw byte-sequence.

The metadata may be physically separated into content-level information, interval-level information, QoS information, and mapping information, and linking of related parts of the content-level information, the interval-level information, the QoS information, and the mapping information may be performed by reference.

According to a further aspect of the present invention, there is provided a method by which a server provides content including one or more intervals, the method including: transmitting metadata of an interval of the content to a client; receiving a request for a fragment from the client, the fragment being selected based on the metadata and being suitable for the interval; parsing the content, and extracting a data part suitable for the fragment; and transmitting the fragment to the client.

According to a further aspect of the present invention, there is provided a client for processing content including one or more intervals, the client including: a transceiver to receive metadata of an interval of the content from a server, to send, to the server, a request for a fragment suitable for the interval, and to receive the fragment from the server; and a controller to process the metadata, and to select the fragment suitable for the interval based on the processed metadata.

Effect of the Invention

According to embodiments of the present invention, it is possible to designate a minimum amount of initially buffered media during playback of content.

Additionally, according to embodiments of the present invention, it is possible to receive bytes within a specific range from a target indicated by a Uniform Resource Locator (URL), and to play back content.

BEST MODE FOR CARRYING OUT THE INVENTION

Figure 1:
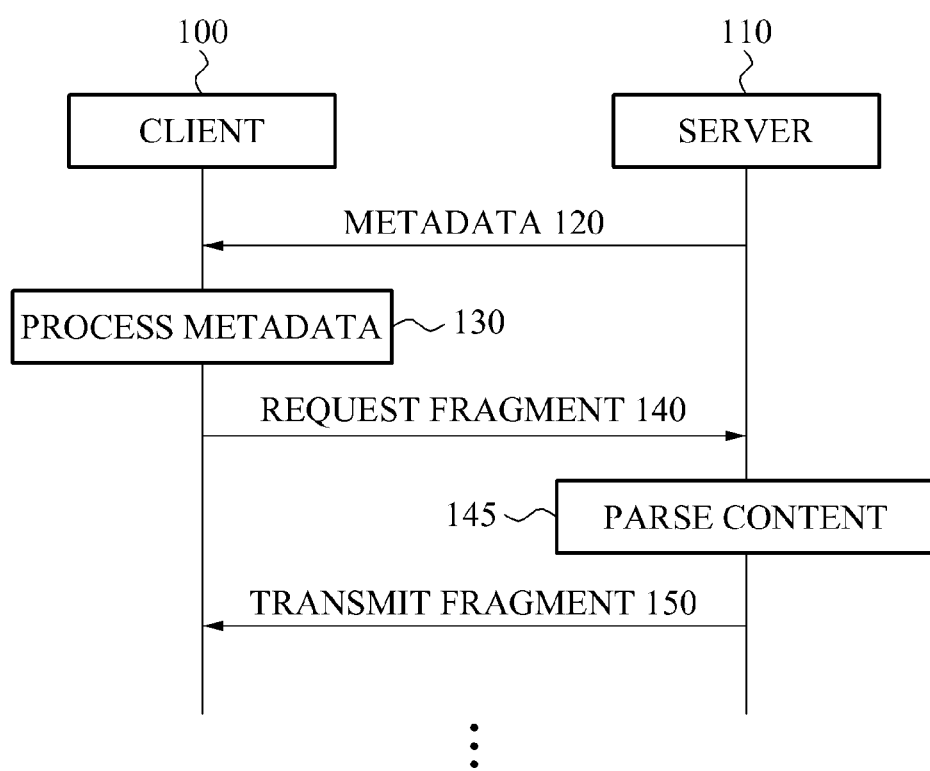
FIG. 1 is a diagram illustrating categories of signaling information according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

A Dynamic Adaptive Streaming over HTTP (DASH) may specify formats that enable 1) transferring of media content from an HTTP server to an HTTP client, and 2) caching of content by standard HTTP caches.

FIG. 1 is a signal flowchart illustrating a content processing method according to an embodiment of the present invention.

A media component may be an encoded version of individual media types, such as audios, videos, or timed texts that have specific attributes, for example bandwidths, languages, or resolutions.

Media content may be a set of media components having a common timeline, for example audios, videos, or timed texts. Additionally, media components may have relationships showing how to present the media components as programs or movies (for example, individually, jointly, or mutually exclusive).

Media content and content may be used as interchangeable terms.

A media presentation may be a structured collection of data used to establish bounded or unbounded presentation of media content including consecutive media components.

In other words, the media presentation may be a structured collection of data enabling access to a DASH client in order to provide a streaming service to a user.

A Media Presentation Description (MPD) may be a formalized description of a media presentation.

The media presentation may include possible updates of the MPD, and may be described by the MPD.

Content may be content on demand, or live content.

The content may be divided into one or more intervals. In other words, the content may include one or more intervals.

Intervals may be interchangeable with periods. The term period may be used as a term of $3^{rd}$ Generation Partnership Project (3GPP) adaptive HTTP streaming.

A period may be an interval of a media presentation. Consecutive sequences of all periods may form a media presentation.

In other words, the media presentation may include one or more periods.

One or more intervals may be a basic unit. One or more intervals may be described by signaling metadata. In other words, metadata may describe each of the one or more intervals.

The metadata may be an MPD.

The MPD may define a format to notify resource identifiers for segments. The MPD may provide a context regarding resources identified in the media presentation. The resource identifiers may be HTTP-Uniform Resource Locators (URLs). URLs may be restricted by a byte range attribute.

Each interval may be divided into fragments.

Fragments may be interchangeable with segments. The term segment may be used as a term of 3GPP adaptive HTTP streaming.

A segment may refer to an entity body of a response to an HTTP/1.1 GET request for an HTTP-URL, for example as defined in RFC 2616, (or a GET request for a part indicated by a byte range). The metadata may include a URL attribute, and a range attribute. A client may receive bytes designated by the range attribute from a URL indicated by the URL attribute. In other words, the bytes may be received by a partial HTTP GET command for the URL instructed by the byte range. The bytes designated by the range attribute may represent the above-described segment.

The range attribute may indicate multiple byte ranges.

The client may play back media content using the received bytes (namely, the segment).

A sub-segment may refer to a smallest unit in segments that may be indexed by a segment index in a segment level.

Two or more sets of fragments corresponding to a single interval may exist. Each of the sets may be called an alternative.

An alternative may be interchangeable with a representation (or an expression).

Each period may include one or more groups.

Each group may include one or more representations of the same media content.

The representation may refer to a structured collection of one or more media components in a single period.

An MPD (or an MPD element) may provide descriptive information that enables a client to select one or more representations.

A Random Access Point (RAP) may be a specific location in a media segment. The RAP may be identified as a location in which playback may be started continuously from a location of the RAP using only information included in a media segment.

Each representation may be formed of one or more segments. In other words, a representation may include one or more segments.

An MPD may be a document including metadata required to a DASH client to form appropriate HTTP-URLs in order to 1) access segments and to 2) provide a user with a streaming service. The HTTP-URLs may be absolute or relative.

The MPD may be an Extensible Markup Language (XML)-document.

The MPD may include an MPD element. The MPD may include only a single MPD element.

A client 100 may be a DASH client.

The DASH client may be compatible with a client specified in RFC 2616.

The DASH client may typically use an HTTP GET method or an HTTP partial GET method, as specified in RFC 2616, to access segments or parts of segments.

A server 110 may perform hosting on DASH segments. The server 110 may be compatible with a server specified in RFC 2616.

In operation 120, the client 100 may receive, from the server 110, 1) metadata of content, or 2) metadata of a specific interval of the content. In other words, the server 110 may transmit, to the client 100, 1) the metadata of the content, or 2) the metadata of the specific interval of the content. The specific interval may indicate a currently processed interval among one or more intervals forming the content.

In operation 130, the client 100 may process the metadata of the specific interval.

In operation 140, the client 100 may send a request for a fragment to the server 110. The client 100 may request the server 110 to transmit fragments suitable for the specific interval based on the processed metadata. In other words, the requested fragments may be selected based on the metadata.

In operation 145, in several cases, the server may need to parse content (for example, a Moving Picture Experts Group (MPEG) layer 4 (MP4) file for Scalable Video Coding (SVC)), and to extract a data part suitable for the requested fragment.

In operation 150, the server 110 may transmit, to the client 100, a fragment suitable for each request from the client 100. The client 100 may receive the fragment from the server.

Subsequently, the entire process may be executed from the beginning. In other words, operation 120 may be repeated on the next interval to the specific interval.

The client 100 may play back content using fragments received when operations 120 through 150 are repeated.

Figure 2:
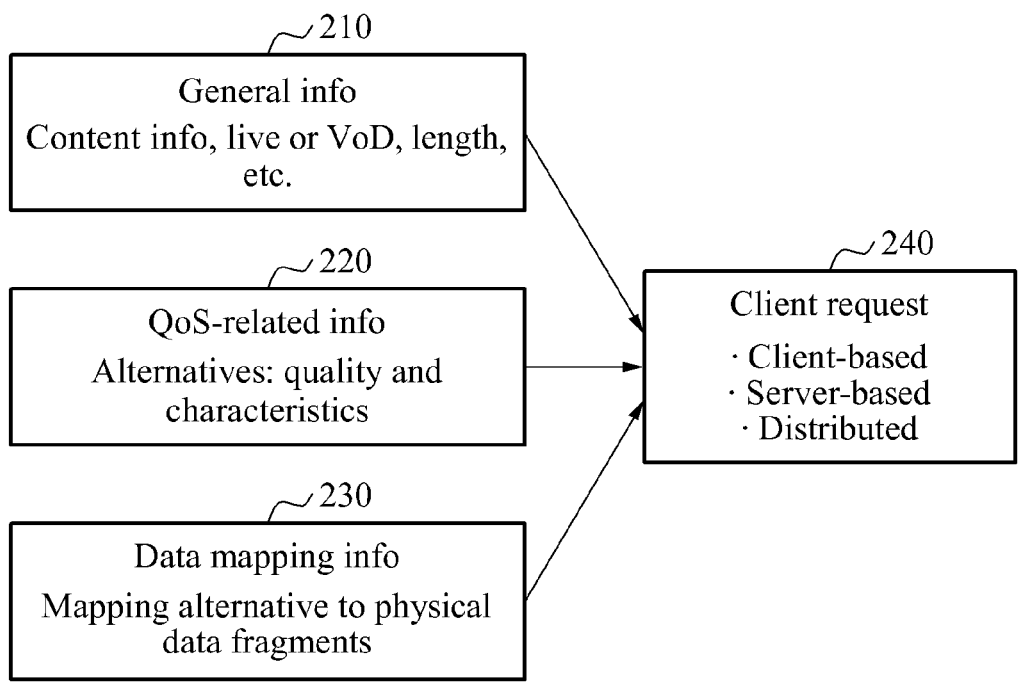
FIG. 2 is a diagram illustrating categories of signaling information according to an embodiment of the present invention.

FIG. 2 is a diagram illustrating categories of signaling information according to an embodiment of the present invention.

The signaling information (namely, metadata) may be divided into the following categories 1) through 4):

1) General information 210: includes common description of content, and general description of each interval, such as a duration, and a start time.

2) Quality of Service (QoS) information 220: describes characteristics of each alternative, such as a bitrate, a resolution, and a quality. In other words, the QoS information describes characteristics of each of alternatives of content.

An alternative may be physical (namely, created in advance), or may be virtual (namely, to be created on the fly). Based on information of alternatives, the client may select a fragment of an appropriate alternative. Accordingly, adaptivity to contexts of terminals and networks may be supported.

3) Mapping information 230: describes locations to retrieve content. Depending on specific cases, different alternatives may have the same or different locations.

4) Client request 240: this type of signaling information may conform to a format of HTTP 1.1 request message. As shown in FIG. 1, parameters requested by the client may be derived from the information of categories 1) through 3).

Objectives of signaling are in the following 1) through 4):

1) Support for different media storage/delivery approaches: the signaling information may be general enough to support typical cases (also various cases) of storage and delivery, such as MPEG-2 Transport Stream (TS), MP4 file including Advanced Video Coding (AVC)/SVC alternatives. Additionally, multi-channel delivery may be required for advanced scenarios (for example, an SVC layer in a single HTTP connection).

2) Support for different cases of decision-making for adaptivity: the signaling information may be flexible to support different locations of decision making, such as a client-based case, a distributed case, and a server-based case.

3) Efficiency: the format of signaling information may allow a small data size and easy handling (for example, parsing, or modifying).

4) Compatibility with a standard HTTP request: the signaling information may provide appropriate description items so that request parameters may be put in an HTTP 1.1 request message, without requiring extensions (for example, new header fields).

Figure 3:
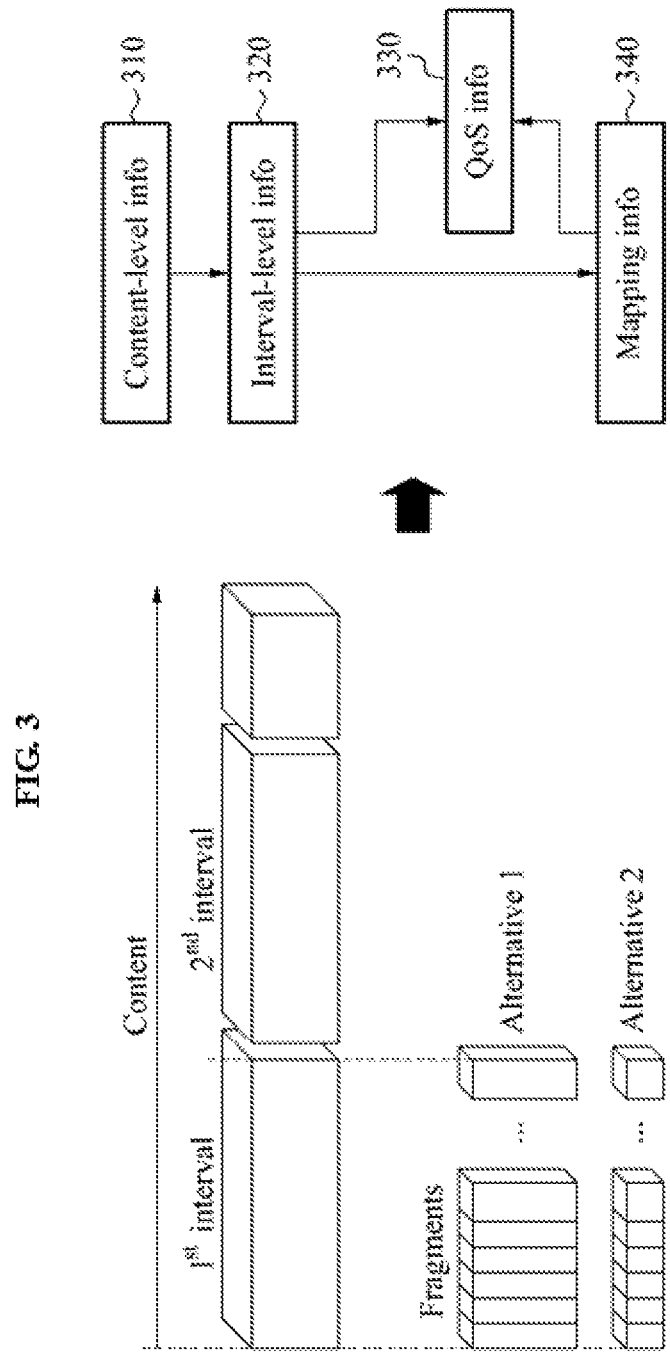
FIG. 3 is a diagram illustrating a hierarchy of content division and levels of signaling information according to an embodiment of the present invention.

FIG. 3 is a diagram illustrating a hierarchy of content division and levels of signaling information according to an embodiment of the present invention.

Signaling of metadata according to an embodiment of the present invention may be physically separated into content-level information 310, interval-level information 320, QoS information 330, and mapping information 340. Linking of related parts of the content-level information 310, the interval-level information 320, the QoS information 330, and the mapping information 340 may be performed by reference.

These parts of signaling information may be combined in different ways to support the flexibility.

For example, when only the content-level information 310 and interval-level information 320 are sent to a client, all computations for deciding alternatives and resolving locations may be performed by a server. Accordingly, when only the content-level information 310 and interval-level information 320 are sent to the client, a processing model may be "server-based."

When the content-level information 310, the interval-level information 320, and the QoS information 330 are sent to the client, all computations for deciding alternatives and resolving locations may be distributed and performed by the client and the server. Accordingly, when the content-level information 310, the interval-level information 320, and the QoS information 330 are sent to the client, the model may be "distributed."

When all the signaling information (namely, the content-level information 310, the interval-level information 320, the QoS information 330, and the mapping information 340) is sent to the client, the model may be client-based, because most (or all) processing (namely, computations for deciding alternatives and resolving locations) is performed by the client.

The separation of metadata parts may enable efficiency in storage and delivery. For example, during a session, metadata of the content-level information 310 may be sent once, and only the interval-level information 320 may be periodically updated. Similarly, a single file containing the QoSInfo 330 may be used for different intervals and different contents.

There are different ways to represent a set of metadata, for example XML, pseudo-code, a Session Description Protocol (SDP), and the like.

XML may be a general language for description. XML may provide rich tools to describe almost everything XML may also be very well-structured, and be suitable for building database. However, XML may have disadvantages of big data size and complexity. In particular, description in XML may require special software (for example, a Document Object Model (DOM), or Simple Application Programming Interface for XML (SAX)), to parse and process the metadata. XML may be often used for syntax of bitstream (MPEG-1, MPEG-2 video bitstream, and file formats). An advantage of the above approach may be compactness of description, but it may not be very flexible to describe various types of syntax element.

In embodiments of the present invention, both XML and pseudo-code may be used to represent signaling syntax. XML syntax may be used for clients that support an XLM profile based on an MPEG-21 and similar schema. On the other hand, pseudo-code syntax may be based on a "language" of an International Organization for Standardization (ISO) base media file format and the like, and may be used in non-XML clients. In particular, a profile of the pseudo-code syntax may employ a parsing module similar to a parsing module of file-format parsing. To design the syntax for the above purpose, a table of common elements may be defined and elements in each format may be represented, in the following embodiments.

The proposed syntax may be represented by any other languages.

Hereinafter, tables of general syntax elements will be described.

In the following tables, the syntax elements may be described hierarchically. In other words, a child element may be shown in a column on the right of a parent element of the child element. "Leaf"-level elements may be shown in italic, and parent elements may be shown in bold letter. A parent element may be represented by a corresponding XML type and a file box.

In the column of occurrence, "0 . . . N" may mean that the number of instances of an occurrence element may be from 0 to "unbounded." The minimum occurrence of 0 may mean that an element may be optional (namely, not present). A minimum occurrence equal to or greater than 1 may mean that an element is mandatory in the syntax.

Occurrence may be interchangeable with cardinality.

In a row of type, A indicates an attribute, and E indicates an element. In a row of optionality, M indicates mandatory, and O indicates optional. For attributes, M indicates mandatory, O indicates optional, OD indicates optional with default value, and CM indicates conditionally mandatory. For elements, elements may be represented as <minOccurs> . . . <maxOccurs>. Here, N may be unbounded.

The above meaning may equally be applied to other tables in the present specification.

Additionally, QoSInfo may be also called AdaptationInfo to make QoSInfo more specific. Moreover, a few elements may be revised to increase flexibility of the syntax.

The following Table 1 describes general information.

TABLE 1

| | | | Occurrence | Semantics | XML syntax (based on MPEG-21) | Pseudo-code (File format box) |
|---|---|---|---|---|---|---|
| HttpStr | | | 1 | Describes the top-level element of signaling metadata for HTTP streaming | HttpStreamingType | 'htps' box |
| | GeneralInfo | | 0 . . . N | Contains the general information of the described content | GeneralInfoType | 'geni' box |
| | | TimeScale | 0 . . . 1 | Describes the number of time units in 1 second. This value is used with time-related elements, when a time unit is not specified. | integer | unsigned int(32) |
| | | LiveStartTime | 0 . . . 1 | If LiveStartTime element is not present, the content is of VoD type. The presence of LiveStartTime element indicates a live content that is to be displayed at a time value of LiveStartTime. If LiveStartTime has a time value of 0, the display time is unknown. | dateTime | unsigned int(64) |
| | | Duration | 0 . . . 1 | If present, indicates duration of the content. Otherwise, the duration is unknown. | integer | unsigned int(32) |
| | | DefaultIntDuration | 0 . . . 1 | If present, indicates a default duration of each interval of the content. | integer | unsigned int(32) |
| | | MinUpdateTime | 0 . . . 1 | If present, indicates the minimum waiting time before requesting the main description file again. | integer | unsigned int(32) |
| | | ConsistentQoSInfo | 0 . . . 1 | If true, indicates that QoS information is the same as the whole content duration. | boolean | flag of the box |
| | | DefaultContentLoc | 0 . . . 1 | Provides a default location for the content. | anyURI | string of URL |
| | IntervalsRef | | 0 . . . N | Provides reference to description containing one or more instances of Interval element. One or more instances of Interval element represent a sequence of consecutive interval(s). | Intervals RefType | 'iref' box |
| | Interval | | 0 . . . N | Provides information of an interval of content. The information of the interval may be either included as an instance of Interval element or referenced by IntervalsRef element. | IntervalType | 'intv' box |
| | | IntervalInfo | 0 . . . 1 | Provides general information of an interval. | IntervalInfoType | 'inti' box |
| | | QoSInfoRef | 0 . . . 1 | Provides reference to description represented by QoSInfo element. If QosInfoRef element is present, QoSInfo element may not be present at the same level. | dia:ReferenceType | 'qref' box |
| | | QoSInfo | 0 . . . 1 | Provides information about alternatives of content, such as resource characteristics and quality/utility. If QoSInfo element is present, QoSInfoRef element may not be present. | QoSInfoType | 'QoSi' box |
| | | MappingInfoRef | 0 . . . 1 | Provides reference to description represented by MappingInfo element. If MappingInfoRef element is present, MappingInfo element may not be present at the same level. | dia:ReferenceType | 'mref' box |
| | | MappingInfo | 0 . . . 1 | Provides information about locations of content alternatives. If the information is not provided, DefaultContentIntLoc element (if not, DefaultContentLoc) can be used to retrieve content. If MappingInfo element is present, MappingInfoRef element may not be present. | MappingInfoType | 'mapi' box |

TABLE 1-continued

|   |   | Occurrence | Semantics | XML syntax (based on MPEG-21) | Pseudo-code (File format box) |
|---|---|---|---|---|---|
|   | NextIntervalsRef | 0 . . . 1 | Provides reference to information of next interval(s). The information of next interval(s) is description containing one or more instances of Interval element. The information of next interval(s) is description represented by Interval element. Using NextIntervalsRef element, the client does not need to reload the main description represented by HttpStr element. Within the current time window, only the final interval may contain NextIntervalsRef element. | Intervals RefType, may be extended from dia:ReferenceType | 'nref' box |
|   | PreviousIntervalsRef | 0 . . . 1 | Provides reference to information of previous interval(s). The information of next interval(s) is description containing one or more instances of Interval element. Using PreviousIntervalsRef element, the client does not need to reload the main description represented by HttpStr element. Within the current time window, only the first interval may contain NextIntervalsRef element. | Intervals RefType, may be extended from dia:ReferenceType | 'nref' box |

The following Table 2 describes IntervalsRef, NextIntervalsRef, PreviousIntervalsRef, QoSInfoRef, MappingInfoRef a, and IntervalInfo.

TABLE 2

|   |   | Occurrence | Semantics | XML syntax (based on MPEG-21) | Pseudo-code (File format box) |
|---|---|---|---|---|---|
| QoSInfoRef, MappingInfoRef | Index | 1 | Indicates the order (starting from 1) of the referenced description or box (Interval, QoSInfo, MappingInfo) in the description file referenced by the next Location element. | not applicable | unsigned int(8) |
|   | Location | 1 | Provides reference to description represented by Interval, QoSInfo, or MappingInfo. | uri element in dia:ReferenceType | string (representing url) |
| IntervalInfo | TimeScale | 0 . . . 1 | Describes the number of time units in one second. This value is used with time-related elements, when a time unit is not specified. TimeScale element, if present, overrides the time scale provided by GeneralInfo. | integer | unsigned int(32) |
|   | StartTime | 0 . . . 1 | Indicates the start time of the interval. |   |   |
|   | Duration | 0 . . . 1 | Indicates the duration of the interval. | integer | unsigned int(32) |
|   | DefaultFragDuration | 0 . . . 1 | Indicates the default duration of fragments of the interval (except the last fragment). | integer | unsigned int(32) |
|   | DefaultContentIntLoc | 0 . . . 1 | Provides a default location for the content interval. | anyURItype | string |
|   | Last | 0 . . . 1 | If true, indicates the final interval of the content. | boolean | by flag |
| IntervalsRef, PreviousIntervalsRef NextIntervalRef | startTime |   | Indicates the start time of the referenced sequence of intervals/periods relative to the start time of the content (LiveStartTime for live content and 0 for on-demand content). | xs:duration |   |
|   | AvailableTime | 0 . . . 1 | Indicates the time the description of the next interval is available. The is the relative time from the start time of the content. | integer | unsigned int(32) |

TABLE 2-continued

|   | Occurrence | Semantics | XML syntax (based on MPEG-21) | Pseudo-code (File format box) |
|---|---|---|---|---|
| Index | 1 | Indicates the order (starting from 1) of the referenced interval description (or box) in the description file referenced by the next Location element. | not applicable | unsigned int(8) |
| Location | 1 | Provides reference to description file that contains Interval descriptions. | sx:anyURI type or uri element in dia:ReferenceType | string (representing url) |

The following Table 3 describes the QoSInfo element.

TABLE 3

|   |   |   | Occurrence | Semantics | XML syntax (based on MPEG-21) | Pseudo-code (File format box) |
|---|---|---|---|---|---|---|
| QoSInfo |   |   | 1 | Provides information about a list of content alternatives, such as resource characteristics and quality/utility. | QoSInfoType containing a UtilityFunction of dia:AdaptiveQoSType | 'QoSi' box |
|   | ClassSchemeRef |   | 0 . . . 1 | Provides a list of classification schemes. The classification schemes provide semantics for some terms or names. | dia:Description MetadataType | 'csmr' box |
|   |   | scheme | 1 . . . N | Provides reference to a classification scheme. | Attr. alias & href in dia:Description MetadataType | a url string |
| (1) | Resource |   | 0 . . . N | Each instance of Resource element describes, for a list of alternatives, characteristic values of a certain resource type (e.g., bitrate). | Element constraint of dia:UFDataType in DIA Utility-FunctionType | 'resi' box |
| (2) | AdaptationOperator |   | 0 . . . N | Each instance of AdaptationOperator element describes, for a list of alternatives, values of a certain adaptation type (e.g., remove temporal layers). | dia:UFDataType | 'adpo' box |
| (3) | Utility |   | 0 . . . N | Each instance of Utility element describes, for a list of alternatives, values in a certain quality/utility type (e.g., MOS). | dia:UFDataType | 'util' box |
|   | UtilityRank |   | 0 . . . 1 | Describes the quality ranking for a list of alternatives. | dia:UtilityRankType | 'utir' box |
|   |   | Value | 1 . . . N | Indicates the quality/utility rank of an alternative. The number of instances of Value element is equal to the number of alternatives. | integer | unsigned int(16) |

The following Table 4 shows common semantics of (1) Resource, (2) AdaptationOperator, and (3) Utility of Table 3.

TABLE 4

|   |   | Occurrence | Semantics | XML syntax (based on MPEG-21) | Pseudo-code (File format box) |
|---|---|---|---|---|---|
| Element (1), (2), (3) | Name | 1 | Describes an identifier for a certain type of the element. When the identifier is not semantically defined by the above embodiment, next three elements are used to find semantics of the identifier in a classification scheme. | Att. 'iOPinRef', ref. a CS term | unsigned int(32) |
|   | CSref_ind | 0 . . . 1 | Indicates the reference index of a classification scheme in the list provided by ClassSchemeRef element. | Not applicable | unsigned int(16) |
|   | LevelNum | 0 . . . 1 | Indicates the number of levels. | Not applicable | unsigned int(16) |

TABLE 4-continued

|  |  | Occurrence | Semantics | XML syntax (based on MPEG-21) | Pseudo-code (File format box) |
|---|---|---|---|---|---|
|  | LevelIndex | 1 . . . N | Each instance of LevelIndex element represents an index value at a level of the classification scheme. | Not applicable | unsigned int(16) |
|  | Value | 1 . . . N | Indicates the value of a resource type (adaptation operator, or utility) of an alternative. The number of instances of Value element is equal to the number of alternatives. | Component in dia:VectorDataType | unsigned int(32) |

The following Table 5 shows mapping information.

TABLE 5

|  |  |  | Occurrence | Semantics | XML syntax (based on MPEG-21) | Pseudo-code (File format box) |
|---|---|---|---|---|---|---|
| MappingInfo |  |  | 0 . . . 1 |  | MappingInfoType | 'mapi' box |
|  | AlterLocID |  | 0 . . . 1 | Provides a location ID for each alternative described in QoSInfo. If AlterLocID element is not present, the first location in the location list may be used for all alternatives. | dia:IntegerVectorType | 'aloc' box |
|  |  | Value | 1 . . . N | Indicates a location ID for an alternative. The number of instances of this element is equal to the number of alternatives. The $n^{th}$ instance of Value element corresponds to the $n^{th}$ alternative of QoSInfo description. | integer | unsigned int(16) |
|  | ReqQoSPara |  | 0 . . . N | Indicates a parameter of QoSInfo that may be put in the request (for an alternative) sent by the client to the server. A parameter may be an instance of Resource, AdaptationOperator, Utility, or UtilityRank elements. | ReqQoSParaType that extends dia:BooleanVectorType | 'reqp' box |
|  |  | RefIndex | 1 | Indicates instance index/reference in the instance list of Resource, AdaptationOperator, Utility and UtilityRank elements. | represented by attribute 'iOPinRef' that references an IOPin in QoSInfo | unsigned int(16) |
|  |  | All | 1 | If true, the parameter needs to be requested for all alternatives and ReqFlag may be skipped. | boolean | flag |
|  |  | ReqFlag | 0 . . . N | Each instance of ReqFlag element corresponds to an alternative. If ReqFlag is true, the request for the corresponding alternative has the parameter identified above. | component of BooleanVectorType | unsigned int(8) |
|  | LocationList |  | 1 | Provides a list of locations for retrieving content alternatives | LocationListType | 'locl' box |
|  |  | Location | 1 . . . N | Provides information of a location | LocationType | 'loca' box |

Semantics of Location elements may be further provided as shown in Table 6.

TABLE 6

|  |  | Occurrence | Semantics | XML syntax (based on MPEG-21) | Pseudo-code (File format box) |
|---|---|---|---|---|---|
| Location |  | 1 . . . N |  | LocationType | 'loca' box |
|  | LocID | 1 | Indicate an ID of an instance of Location element. Location element is referred to by AlterLocID. | integer | unsigned int(16) |

TABLE 6-continued

| | | | Occurrence | Semantics | XML syntax (based on MPEG-21) | Pseudo-code (File format box) |
|---|---|---|---|---|---|---|
| StrLocation | | | 0 . . . N | Provides location information of a stream of a content interval. Each stream is provided by either a stream URL or a number of fragment URLs. | StrLocationType | 'stlo' box |
| | FragNum | | 0 . . . 1 | Provides the number of fragments | integer | unsigned int(16) |
| | StreamUrl | | 0 . . . 1 | Describes a URL of a stream | anyURI type | string |
| | FragmentUrl | | 0 . . . N | Describes a URL of a fragment. The number of instances of FragmentUrl element is the number of fragments. | anyURI type | string |
| | FragTime | | 0 . . . 1 | Provides durations of fragments. | dia:VectorDataType | 'frtm' box |
| | | Value | 1 . . . N | Indicates a duration of a fragment. The number of instances of Value element is the number of fragments. | integer | unsigned int(32) |
| | RandAccess | | 0 . . . 1 | Describes fragments that support random access. | dia:VectorDataType | 'rdac' box |
| | | Value | 1 . . . N | Indicates the order of a random-access fragment. | integer | unsigned int(16) |
| | MP2TSPara | | 0 . . . 1 | Describes additional parameters (beside URL) for locating a content/program in a MPEG-2 TS. | MP2TSParaType | 'mp2p' box |
| | | PID | 1 . . . N | Describes values of PIDs of content/program in a MPEG-2 TS. | integer | unsigned int(16) |
| | FragBoundaries | | 0 . . . 1 | Describes boundaries of (virtual) fragments in a stream. The number of instances of FragBoundaries element is equal to the number of fragments of the stream. Only one type of following elements is present in a FragBoundaries instance. | FragBoundariesType | 'frbd' box |
| | | MP2TSBoundary | 0 . . . N | Describes parameters for detecting (virtual) fragment boundary in a MPEG-2 TS. If there are two instances of MP2TSBoundary element, the two instances are starting and ending boundaries of a fragment. If there is only one instance of MP2TSBoundary element, the instance is the starting boundary. The ending boundary is right before the starting boundary of the next fragment. | MP2TSBoundaryType | 'mp2b' box |
| | | ISOFileBoundary | 1 . . . 2 | Describes parameters for detecting (virtual) fragment boundary in a file based on ISO base media file format. If there are two instances of ISOFileBoundary element, the two instances are starting and ending boundaries of a fragment. If there is only one instance of ISOFileBoundary element, the instance is the starting boundary. The ending boundary is right before the starting boundary of the next fragment. | ISOFileBoundaryType | 'isfb' box |

TABLE 6-continued

| | | Occurrence | Semantics | XML syntax (based on MPEG-21) | Pseudo-code (File format box) |
|---|---|---|---|---|---|
| | ByteRanges | 1 | Describes byte ranges that identify a part/fragment of a file. Parameters provided by ByteRanges element may be used for byte range options in an HTTP request. | ByteRangesType | 'brag' box |

Semantics of MP2TSBoundary, ISOFileBoundary, and ByteRanges may be further provided as shown in Table 7.

TABLE 7

| | | Occurrence | Semantics | XML syntax (based on DIA) | Pseudo-code (MP4) |
|---|---|---|---|---|---|
| MP2TSBoundary | | | | MP2TSBoundaryType | 'mp2b' box |
| | PCR_PID | 1 | Describes PID carrying PCR of the concerned content/program. | integer | unsigned int(16) |
| | PCR_base | 1 | Describes a value of a PCR base field | long | unsigned int(40) |
| | PCR_ext | 1 | Describes a value of a PCR extension field. | integer | unsigned int(16) |
| | Appearance | 1 | Describes the appearance order (e.g., $1^{st}$, $2^{nd}$) of the TS packet containing the PCR value identified by the above two elements. If there is resetting/discontinuity of PCR, a PCR value may appear more than once during an interval. | integer | unsigned int(16) |
| | Media_PID | 1 ... N | Describes PID of a media (e.g., video) of a program. The number of instances of Media_PID element is equal to the number of media of the program/content. | integer | unsigned int(16) |
| | Media_Offset | 1 ... N | Describes the offset (in TS packets of the same media PID) from the above identified PCR packet to the first media packet of a fragment. The $n^{th}$ instance of Media_Offset is associated with the $n^{th}$ instance of Media_PID. | integer | unsigned int(16) |
| ISOFileBoundary | | | | ISOFileBoundaryType | 'isfb' box |
| | SequenceNo | 1 | Describes the sequence number provided in the mfhd box. The mfhd box defines a fragment of an MP4 file. SequenceNo with a value of 0 indicates the beginning of the file. | integer | unsigned int(16) |
| ByteRanges | | | | ByteRangesType | 'brag' box |
| | Start | 1 ... N | Describes the starting value of a byte range. A value of '−1' means that this value in the HTTP request is missing. | integer | unsigned int(32) |
| | End | 1 ... N | Describes the ending value of a byte range. A value of '−1' means that this value in the HTTP request is missing. Start-End instances are present in pair. The $n^{th}$ instance of End is associated with the $n^{th}$ instance of Start. | integer | unsigned int(32) |

TABLE 7-continued

|  | Occurrence | Semantics | XML syntax (based on DIA) | Pseudo-code (MP4) |
|---|---|---|---|---|
| Media_PID | 0 . . . N | Describes PID of a media (e.g., video) that needs to be extracted from the byte range of the above pair of Start-End. Media_PID element is used when the byte range is a segment of MPEG-2 TS, and all PIDs do not need to be delivered. | integer | unsigned int(16) |

Hereinafter, a Client Request Will be Described.

Signaling of metadata obtained by a client may include different parts or levels of signaling information. Accordingly, a request from the client to a server may include parameters of different levels of details.

Main parameters of the client may be Uniform Resource Identifiers (URIs), and may be associated with a query part.

Three main scenarios are examined as follows:

1) Server-Based Scenario

In the server-based scenario, the metadata provided from the server to the client may include general content information 310 and general interval information 320.

For an URI of requested content, DefaultContentIntLoc (if not, DefaultContentIntLoc) may be used. To enable the client to request a specific fragment of content, the following parameters a) and b) are defined in the query part (of the request in operation 140):

a) "fragno": Order value of the fragment in the interval b) "fragti": Start time of the fragment in the interval For example, a request URI may be "HTTP://server.com/file.mp4?fragno=5."

2) Distributed Scenario

In the distributed scenario, the metadata provided from the server to the client may include general content information 310, general interval information 320, and QoS information 330.

In addition to the above parameters, the following QoS-related parameters a) through c) are defined in the query part (of the request in operation 140) to enable the client to request an appropriate alternative:

a) "alter": Order value of an alternative. Based on the order value of the alternative, the alternative may appear in the QoS information.

b) "oper1", "oper2", . . . , and "operN": "operi" carries a value of an $i^{th}$ adaptation operation that appears in the QoS information.

c) "res1", "res2", . . . , "resN": "resi" carries a value of an $i^{th}$ resource that appears in the QoS information.

Only one of the above three options may be used in a single request.

With typical adaptation operators and resource types, specific parameter names for better intelligibility and interoperability may be defined.

Adaptation operators are as the following a) through e).

a) audiolayers: indicates the number of scalable audio layers to be discarded.

b) temporallayers: indicates the number of temporal layers of scalable video to be discarded.

c) spatiallayers: indicates the number of spatial layers of scalable video to be discarded.

d) qualitylayers: indicates the number of quality layers of scalable video to be discarded.

e) prioritylayers: indicates the number of priority layers of scalable video to be discarded.

Resource types are as the following a) through d).

a) bitrate: indicates the average bitrate (in Kbps) of the requested alternative.

b) vertresolution: indicates the vertical resolution of the requested alternative.

c) horiresolution: indicates the horizontal resolution of the requested alternative.

d) framerate: indicates the framerate of the requested alternative.

Using the pre-defined parameters, an example of a request URI based on the bitrate may be "http://server.com/file.mp4?fragno=5&bitrate=550."

3) Client-Based Scenario

In the client-based scenario, the metadata provided from the server to the client may include general content, general interval information, QoS information, and mapping information.

The QoS-related parameters used in the request may be indicated by a ReqQoSPara part of QoSInfo metadata. For example, when RefIndex of ReqQoSPara is 0 or null, the "alter" parameter may be used instead of other options.

When ReqQoSPara is not present in the QoSInfo metadata, the QoS-related parameters may not be used. Alternatives in this case may be implied by locations of MappingInfo.

A URI of content may be derived from rich description of MappingInfo. When content/program is conveyed in an MPEG-2 TS, one or more PIDs may be used to locate the content in the stream.

When additional information for detecting fragment boundaries are provided, the following parameters 1) through 3) for the query part (of the request in operation 140) may be used.

1) For an MPEG-2 TS boundary, Appearance, PCR_PID, PCR_base, PCR_ext, Media_PID, and Media_Offset 2) For an ISO media file boundary, SequenceNo 3) For a file considered as a raw byte-sequence, Start and End Semantics of the above parameters may be provided in semantics of a FragBoundaries element.

Start-End pairs may be used by a range header of an HTTP request message. For example, if {Start=0, End=99); (Start=200, End=299)}, the header may be "Range: bytes=0-99, 200-299."

Hereinafter, syntax representation in an XML format will be described. Representations of the above syntax elements may be provided in the XML format. Semantics of each element may be traced back in the above Tables 1 through 7.

Several elements may be extensions of several types defined in an MPEG-21 DIA. Several few elements may take several types defined in the MPEG-21 DIA.

The following Table 8 shows syntax representation of HTTPStreamingType in the XML format.

TABLE 8

```
<complexType name="HTTPStreamingType">
  <complexContent>
    <extension base="dia:DIADescriptionType">
      <sequence>
        <element name="GeneralInfo" type="GeneralInfoType"
          minOccurs="0"/>
        <choice minOccurs="0" maxOccurs="unbounded">
          <element name="IntervalsRef" type="IntervalsRefType"/>
          <element name="Interval" type="IntervalType"/>
        </choice>
```

TABLE 8-continued

```
      </sequence>  </complexContent>
</complexType>
```

The following Table 9 shows syntax representation of GeneralInfoType in the XML format.

TABLE 9

```
<complexType name="GeneralInfoType">
  <complexContent>
    <extension base="dia:DIADescriptionType">
      <sequence>
        <element name="TimeScale" type="integer" minOccurs="0"/>
        <element name="LiveStartTime" type="dateTime"
          minOccurs="0"/>
        <element name="Duration" type="integer" minOccurs="0"/>
        <element name="DefaultIntDuration" type="integer"
          minOccurs="0"/>
        <element name="MinUpdateTime" type="integer"
          minOccurs="0"/>
        <element name="ConsistentQoSInfo" type="boolean"
          minOccurs="0"/>
        <element name="DefaultContentLoc" type="anyURI"
          minOccurs="0"/>
      </sequence>
    </extension>
  </complexContent>
</complexType>
```

The following Table 10 shows syntax representation of IntervalRefType in the XML format.

TABLE 10

```
<complexType name="IntervalsRefType">
  <complexContent>
    <extension base="dia:ReferenceType">
      <sequence>
        <element name="AvaliableTime" type="integer" minOccurs="0"/>
      </sequence>
      <attribute name="startTime" type="xs:duration" use="optional"/>
    </extension>
  </complexContent>
</complexType>
```

The following Table 11 shows syntax representation of IntervalType in the XML format.

TABLE 11

```
<complexType name="IntervalType">
  <complexContent>
    <extension base="dia:DIADescriptionType">
      <sequence>
        <element name="IntervalInfo" type="IntervalInfoType" minOccurs="0"/>
        <choice minOccurs="0">
          <element name="QoSInfo" type="QoSInfoType"/>
          <element name="QoSInfoRef" type="dia:ReferenceType"/>
        </choice>
        <choice minOccurs="0">
          <element name="MappingInfo" type="MappingInfoType"/>
          <element name="MappingInfoRef" type="dia:ReferenceType"/>
        </choice>
        <element name="PreviousIntervalsRef"
          type="IntervalsRefType" minOccurs="0"/>
        <element name="NextIntervalsRef" type="IntervalsRefType"
          minOccurs="0"/>
      </sequence>
    </extension>
  </complexContent>
</complexType>
```

The following Table 12 shows syntax representation of IntervalInfoType in the XML format.

TABLE 12

```
<complexType name="IntervalInfoType">
  <sequence>
    <element name="TimeScale" type="integer" minOccurs="0"/>
    <element name="StartTime" type="dateTime" minOccurs="0"/>
    <element name="Duration" type="integer" minOccurs="0"/>
    <element name="DefaultFragDuration" type="integer"
      minOccurs="0"/>
    <element name="DefaultContentIntLoc" type="anyURI"
      minOccurs="0"/>
    <element name="Last" type="boolean" minOccurs="0"/>
  </sequence>
</complexType>
```

The following Table 13 shows syntax representation of QoSInfoType in the XML format.

TABLE 13

```
<complexType name="QoSInfoType">
  <complexContent>
    <extension base="dia:DIADescriptionType">
      <sequence>
        <element name="DescriptionMetadata"
          type="dia:DescriptionMetadataType" minOccurs="0"/>
```

TABLE 13-continued

```
        <element name="Description" type="dia:AdaptationQoSType"/>
      </sequence>
    </extension>
  </complexContent>
</complexType>
```

The following Table 14 shows syntax representation of MappingInfoType in the XML format.

TABLE 14

```
<complexType name="MappingInfoType">
  <complexContent>
    <extension base="dia:DIADescriptionType">
      <sequence>
        <element name="AlterLocIDs" type="IntegerVectorType" minOccurs="0"/>
        <element name="ReqQoSPara" type="ReqQoSParaType" minOccurs="0" maxOccurs="unbounded"/>
        <element name="LocationList" type="LocationListType"/>
      </sequence>
    </extension>
  </complexContent>
</complexType>
```

The following Table 15 shows syntax representation of ReqQoSParaType in the XML format.

TABLE 15

```
<complexType name="ReqQoSParaType">
  <complexContent>
    <extension base="dia:BooleanVectorType">
      <attribute name="all" type="boolean" use="optional"/>
      <attribute name="iOPinRef" type="anyURI" use="required"/>
    </extension>
```

TABLE 15-continued

```
  </complexContent>
</complexType>
```

The following Table 16 shows syntax representation of LocationListType in the XML format.

TABLE 16

```
<complexType name="LocationListType">
  <sequence>
    <element name="Location" type="LocationType"
```

TABLE 16-continued

```
      maxOccurs="unbounded"/>
  </sequence>
</complexType>
```

The following Table 17 shows syntax representation of LocationType in the XML format.

TABLE 17

```
<complexType name="LocationType">
  <sequence>
    <element name="StrLocation" type="StrLocationType" maxOccurs="unbounded"/>
  </sequence>
  <attribute name="locID" type="integer" use="required"/>
</complexType>
```

The following Table 18 shows syntax representation of StrLocationType in the XML format.

TABLE 18

```
<complexType name="StrLocationType">
  <sequence>
    <element name="FragNum" type="integer" minOccurs="0" />
    <choice>
      <element name="StreamUrl" type="anyURI"/>
      <element name="FragmentUrl" type="anyURI" maxOccurs="unbounded"/>
    </choice>
    <element name="FragTime" type="dia:IntegerVectorType" minOccurs="0" />
    <element name="RandAccess" type="dia:IntegerVectorType" minOccurs="0" />
    <element name="MP2TSPara" type="MP2TSParaType" minOccurs="0"/>
    <element name="FragBoundaries" type="FragBoundariesType" maxOccurs="unbounded"/>
  </sequence>
</complexType>
```

The following Table 19 shows syntax representation of MP2TSParaType in the XML format.

TABLE 19

```
<complexType name="MP2TSParaType">
  <sequence>
    <element name="PID" type="integer" maxOccurs="unbounded"/>
  </sequence>
</complexType>
```

The following Table 20 shows syntax representation of FragBoundariesType in the XML format.

TABLE 20

```
<complexType name="FragBoundariesType">
  <sequence>
    <choice>
      <element     name="MP2TSBoundary"     type="MP2TSBoundaryType" maxOccurs="2"/>
      <element     name="ISOFileBoundary"     type="ISOFileBoundaryType" maxOccurs="2"/>
      <element name="ByteRanges" type="ByteRangesType"/>
    </choice>
  </sequence>
</complexType>
```

The following Table 21 shows syntax representation of MP2TSBoundaryType in the XML format.

TABLE 21

```
<complexType name="MP2TSBoundaryType">
  <sequence>
    <element name="PCR_PID" type="integer"/>
    <element name="PCR_base" type="long"/>
    <element name="PCR_ext" type="integer"/>
    <element name="Appearance" type="integer"/>
    <element name="Media_PID" type="integer" maxOccurs="unbounded"/>
    <element name="Media_Offset" type="integer" maxOccurs="unbounded"/>
  </sequence>
</complexType>
```

The following Table 22 shows syntax representations of ISOFileBoundaryType and ByteRangesType in the XML format.

TABLE 22

```
<complexType name="ISOFileBoundaryType">
  <sequence>
    <element name="SequenceNo" type="integer" maxOccurs="unbounded"/>
  </sequence>
</complexType>
<complexType name="ByteRangesType">
  <sequence maxOccurs="unbounded">
    <element name="Start" type="integer"/>
    <element name="End" type="integer"/>
    <element name="Media_PID" type="integer" minOccurs="0"/>
  </sequence>
</complexType>
```

Hereinafter, syntax representation in an MP4 pseudo-code format will be described. Representation of the above syntax elements may be provided in the MP4 pseudo-code format.

The following Table 23 shows syntax representation of HTTPStreamingBox in the MP4 pseudo-code format.

TABLE 23

HTTPStreamingBox

Box Type: 'htps'
Container: Signaling file

TABLE 23-continued

HTTPStreamingBox

Mandatory: Yes
Quantity: One
  Aligned(8) class HTTPStreamingBox extends Box('htps') {
  }

The following Table 24 shows syntax representation of GeneralInfoBox in the MP4 pseudo-code format.

TABLE 24

GeneralInfoBox
Box Type: 'geni'
Container: 'htps'
Mandatory: No
Quantity: One
  Aligned(8) class GeneralInfoBox extends Box('geni') {
    bit(1)      consistentQoSInfo_flag;
    bit(1)      timescale_flag;
    bit(1)      live_start_time_flag;

TABLE 24-continued

```
bit(1)       duration_flag;
bit(1)       default_interval_duration_flag;
bit(1)       min_update_time_flag;
bit(1)       default_content_loc_flag;
bit(1)       reserved;
if (timescale_flag==1) { unsigned int(32)        timescale;}
if (live_start_time_flag==1) { unsigned int(64)   live_start_time;}
if (duration_flag==1) { unsigned int(32)          duration;}
if          (default_interval_duration_flag==1)   {unsigned      int(32)
default_interval_duration; }
if (min_update_time==1) {unsigned int(32)         min_update_time; }
if (default_content_loc_ref ==1) {string default_content_loc_ref; }
1
```

Hereinafter, interval-level information will be described.
The following Table 25 shows syntax representation of IntervalBox in the MP4 pseudo-code format.

TABLE 25

IntervalBox

Box Type: 'intv'
Container: 'htps'
Mandatory: No
Quantity: One or more
  Aligned(8) class IntervalBox extends Box('intv') {
  }

The following Table 26 shows syntax representation of IntervalRefBox in the MP4 pseudo-code format.

TABLE 26

IntervalRefBox
Box Type: 'iref'
Container: 'htps'
Mandatory: No
Quantity: One or more
  Aligned(8) class IntervalRefBox extends Box('iref') {
    unsigned int(8) index;
    string            location;
  }

The following Table 27 shows syntax representation of QoSInfoRefBox in the MP4 pseudo-code format.

TABLE 27

QoSInfoRefBox

Box Type: 'qref'
Container: 'intv'
Mandatory: No
Quantity: Zero or more
  Aligned(8) class QoSInfoRef extends Box('qref') {
    unsigned int(8) index;
    string            location;
  }

The following Table 28 shows syntax representation of MappingInfoRefBox in the MP4 pseudo-code format.

TABLE 28

MappingInfoRefBox

Box Type: 'mref'
Container: 'intv'
Mandatory: No
Quantity: Zero or more
  Aligned(8) class MappingInfoRef extends Box('mref') {
    unsigned int(8) index;
    string            location;
  }

The following Table 29 shows syntax representation of IntervalInfoBox in the MP4 pseudo-code format.

TABLE 29

IntervalInfoBox

Box Type: 'inti'
Container: 'intv'
Mandatory: No
Quantity: Zero or more
  Aligned(8) class IntervalInfoBox extends Box('geni') {
    bit(1)   last_flag;
    bit(1)   timescale_flag;
    bit(1)   start_time_flag;
    bit(1)   duration_flag;
    bit(1)   default_frag_duration_flag;
    bit(1)   default_content_interval_loc_flag;
    bit(2)   reserved;
    if (timescale_flag==1) {unsigned int(32) timescale;}
    if (start_time_flag==1) {unsigned int(32) start_time;}
    if (duration_flag==1) {unsigned int(32) duration;}
    if (default_frag_duration==1) {unsigned int(32) default_frag_duration; }
    if          (default_content_interval_loc_flag==1)      {string
default_content_interval_loc; }
  }
```

The following Table 30 shows syntax representation of NextIntervalRefBox in the MP4 pseudo-code format.

TABLE 30

| NextIntervalRefBox |
|---|
| Box Type: 'nref'<br>Container: 'intv'<br>Mandatory: No<br>Quantity: Zero or more |

TABLE 30-continued

| NextIntervalRefBox |
|---|
| Aligned(8) class NextIntervalRef extends Box('nref') {<br>   unsigned int(32)            available_time;<br>   unsigned int(8)       index;<br>   string                       location;<br>} |

Hereinafter, QoS information will be described.

The following Table 31 shows syntax representation of QoSInfoBox in the MP4 pseudo-code format.

TABLE 31

| QoSInfoBox |
|---|
| Box Type: 'QoSi'<br>Container: 'intv' or 'htps'<br>Mandatory: No<br>Quantity: Zero or more<br>Note: when a 'QoSi' box is stored separately from other signaling metadata, it will stay directly in 'htps' box for the purpose of easy referencing.<br>   Aligned(8) class QoSInfoBox extends Box('QoSi') {<br>   } |

The following Table 32 shows syntax representation of ClassSchemeRefBox in the MP4 pseudo-code format.

TABLE 32

| ClassSchemeRefBox |
|---|
| Box Type: 'csmr'<br>Container: 'QoSi'<br>Mandatory: No<br>Quantity: Zero or more<br>   Aligned(8) class ClassSchemeRef extends Box('csmr') {<br>      unsigned int(32)       entry_count;<br>      for (i=1; i <= entry_count ; i++)   {<br>         string    scheme;                     //URL<br>      }<br>   } |

The following Table 33 shows syntax representation of ResourceBox in the MP4 pseudo-code format.

TABLE 33

| ResourceBox |
|---|
| Box Type: 'resi'<br>Container: 'QoSi'<br>Mandatory: No<br>Quantity: Zero or more<br>  Aligned(8) class ResouceBox extends Box('resi') {<br>    unsigned int(32)       name;<br>    if (name=="r000"\|\|name=="r001"\|\|name=="r002"\|\|name=="r003"\|\|name=="r004"\|\|name=="r005"\|\|name=="r006"\|\|name=="r007"\|\|name=="r008"\|\|name=="r009")<br>    {<br>      unsigned int(16)       csref_ind;<br>      unsigned int(16)       level_num;<br>      for (i=1; i <= level_num ; i++)   {<br>        unsigned int(32)       level_index;<br>      }<br>    }<br>    for (i=1;     ; i++)   {<br>      unsigned int(32)      value;<br>    }<br>  }<br>  We define some typical names of resource types as follows<br>    'bitr' means average bitrate of the content<br>    "frar" means frame rate of video content<br>    "verr" means vertical resolution of video frame<br>    "horr" means horizontal resolution of video frame |

TABLE 33-continued

| ResourceBox |
|---|
| When a resource type defined in some Classification Scheme should be used, the resource takes a "dummy name" among {'r000', 'r001', ...., 'r009'} and some special parameters (csref_ind, level_num, level_index) are used to associate that "dummy name" with a term of semantics in the Classification Scheme. |

The following Table 34 shows syntax representation of AdaptationOperatorBox in the MP4 pseudo-code format.

TABLE 34

| AdaptationOperatorBox |
|---|
| Box Type: 'adpo'<br>Container: 'QoSi'<br>Mandatory: No<br>Quantity: Zero or more<br>   Aligned(8) class AdaptationOperatorBox extends Box('adpo') {<br>     unsigned int(32)          name;<br>     if (name=="a000"‖name=="a001"‖name=="a002"‖name=="a003"‖name=="a004"‖ name=="a005"‖name=="a006"‖name=="a007"‖name=="a008"‖name=="a009")<br>      {<br>       unsigned int(16)          csref_ind;<br>       unsigned int(16)          level_num;<br>       for (i=1; i <= level_num ; i++)       {<br>         unsigned int(32)          level_index;<br>       }<br>      }<br>     for (i=1;      ; i++)     {<br>       unsigned int(32)        value;<br>     }<br>   }<br>We define some typical names of adaptation operator types as follows<br>   'spals' means the number of spatial layers to be discarded, from the highest one.<br>   'quls' means the number of quality layers to be discarded, from the highest one.<br>   'tmls' means the number of temporal layers to be discarded, from the highest one.<br>When a adaptation operator type defined in some Classification Scheme (outside this standard) should be used, the operator takes a "dummy name" among {'a000', 'a001', ..., 'a009'} and some special parameters (csref_ind, level_num, level_index) are used to associate that "dummy name" with a term of semantics in the Classification Scheme. |

The following Table 35 shows syntax representation of UtilityBox in the MP4 pseudo-code format.

TABLE 35

| UtilityBox |
|---|
| Box Type: 'util'<br>Container: 'QoSi'<br>Mandatory: No<br>Quantity: Zero or more<br>   Aligned(8) class UtilityBox extends Box('util') {<br>     unsigned int(32)          name;<br>     if (name=="u000"‖name=="u001"‖name=="u002"‖name=="u003"‖name=="u004"‖ name=="u005"‖name=="u006"‖name=="u007"‖name=="u008"‖name=="u009")<br>      {<br>       unsigned int(16)          csref_ind;<br>       unsigned int(16)          level_num;<br>       for (i=1; i <= level_num ; i++)       {<br>         unsigned int(32)          level_index;<br>       }<br>      }<br>     for (i=1;      ; i++)     {<br>       unsigned int(32) value;<br>     }<br>   }<br>We define some typical names of utilities as follows |

The following Table 36 shows syntax representation of UtilityRankBox in the MP4 pseudo-code format.

TABLE 36

UtilityRankBox

Box Type: 'utir'
Container: 'QoSi'
Mandatory: No
Quantity: Zero or more
   Aligned(8) class UtilityRankBox extends Box('utir') {
     for (i=1; ; i++) {
       unsigned int(32)   value;
     }
   }

Hereinafter, mapping information will be described.

The following Table 37 shows syntax representation of MappingInfoBox in the MP4 pseudo-code format.

TABLE 37

MappingInfoBox

Box Type: 'mapi'
Container: 'intv' or 'htps'
Mandatory: No
Quantity: Zero or more
   Note: when a 'mapi' box is stored separately from other signaling metadata, it will stay directly in 'htps' box for the purpose of easy referencing.
   Aligned(8) class MappingInfoBox extends Box('mapi') {
   }

The following Table 38 shows syntax representation of AlterLocIDBox in the MP4 pseudo-code format.

TABLE 38

AlterLocIDBox

Box Type: 'aloc'
Container: 'mapi'
Mandatory: No
Quantity: Zero or more
   Aligned(8) class AlterLocIDBox extends Box('aloc') {
     for (i=1; ; i++) {
       unsigned int(32)   value;
     }
   }

The following Table 39 shows syntax representation of ReqQoSParaBox in the MP4 pseudo-code format.

TABLE 39

ReqQoSParaBox

Box Type: 'reqp'
Container: 'mapi'
Mandatory: No
Quantity: Zero or more

TABLE 39-continued

ReqQoSParaBox

Aligned(8) class ReqQoSParaBox extends Box('reqp') {
  bit(1)   all_flag;
  bit(7)   reserved;
  unsigned int(32) refindex;
  if ( all_flag == 0) {
    for (i=1; ; i++) {
      unsigned int(8) req_flag;
    }
  }
}

The following Table 40 shows syntax representation of ReqQoSParaBox in the MP4 pseudo-code format.

TABLE 40

ReqQoSParaBox

Box Type: 'locl'
Container: 'mapi'
Mandatory: No
Quantity: Zero or more
   Aligned(8) class LocationListBox extends Box('locl') {
   }

The following Table 41 shows syntax representation of LocationBox in the MP4 pseudo-code format.

TABLE 41

LocationBox

Box Type: 'loca'
Container: 'locl'
Mandatory: Yes
Quantity: One or more
   Aligned(8) class LocationBox extends Box('loca') {
     unsigned int(16)   frag_num;
     unsigned int(16)   locID;
   }

The following Table 42 shows syntax representation of FragTimeBox in the MP4 pseudo-code format.

---

TABLE 35-continued

UtilityBox

'psnr'
'mos'
   When a utility type defined in some Classification Scheme (outside this standard) should be used, the operator takes a "dummy name" among {'u000', 'u001', ..., 'u009'} and some special parameters (csrefind, level_num, level_index) are used to associate that "dummy name" with a term of semantics in the Classification Scheme.

TABLE 42

| FragTimeBox |
| --- |
| Box Type: 'frtm'<br>Container: 'loca'<br>Mandatory: No<br>Quantity: Zero or more<br>    Aligned(8) class FragTimeBox extends Box('frtm') {<br>        for (i=1;  ; i++) {<br>           unsigned int(32)    value;<br>        }<br>    } |

The following Table 43 shows syntax representation of RandAccessBox in the MP4 pseudo-code format.

TABLE 43

| RandAccessBox |
| --- |
| Box Type: 'rdac'<br>Container: 'loca'<br>Mandatory: No<br>Quantity: Zero or more<br>    Aligned(8) class RandAccessBox extends Box('rdac') {<br>        for (i=1;  ; i++) {<br>           unsigned int(16)    value;<br>        }<br>    } |

The following Table 44 shows syntax representation of StrLocationBox in the MP4 pseudo-code format.

TABLE 44

| StrLocationBox |
| --- |
| Box Type: 'stlo'<br>Container: 'loca'<br>Mandatory: Yes<br>Quantity: One or more<br>    Aligned(8) class StrLocationBox extends Box('stlo') {<br>        bit(1)    stream_url_flag;<br>        bit(7)    reserved;<br>        if (stream_url_flag == 1) {<br>           string stream_url;<br>        } else {<br>           for (i=1;  ; i++) {<br>               string    fragment_url;<br>           }<br>        }<br>    } |

The following Table 45 shows syntax representation of MP2TSParaBox in the MP4 pseudo-code format.

TABLE 45

| MP2TSParaBox |
| --- |
| Box Type: 'mp2p'<br>Container: 'loca'<br>Mandatory: No<br>Quantity: Zero or more<br>    Aligned(8) class MP2TSParaBox extends Box('mp2p') {<br>        for (i=1;  ; i++) {<br>           unsigned int(16)    PID;<br>        }<br>    } |

The following Table 46 shows syntax representation of FragBoundariesBox in the MP4 pseudo-code format.

TABLE 46

| FragBoundariesBox |
| --- |
| Box Type: 'frbd'<br>Container: 'loca'<br>Mandatory: No<br>Quantity: Zero or more<br>    Aligned(8) class FragBoundariesBox extends Box('frbd') {<br>    } |

The following Table 47 shows syntax representation of MP2TSBoundaryBox in the MP4 pseudo-code format.

TABLE 47

| MP2TSBoundaryBox |
| --- |
| Box Type: 'mp2b'<br>Container: 'frbd'<br>Mandatory: No<br>Quantity: Zero or more<br>    Aligned(8) class MP2TSBoundaryBox extends Box('mp2b') {<br>        unsigned int(16)    appearance;<br>        unsigned int(16)    PCR_ID;<br>        unsigned int(40)    PCR_base;<br>        unsigned int(16)    PCR_ext;<br>        for (i=1;  ; i++) {<br>           unsigned int(16)    media_PID;<br>        }<br>        for (i=1;  ; i++) {<br>           unsigned int(16)    media_offset;<br>        }<br>    } |

The following Table 48 shows syntax representation of ISOFileBoundaryBox in the MP4 pseudo-code format.

TABLE 48

| ISOFileBoundaryBox |
| --- |
| Box Type: 'isfb'<br>Container: 'frbd'<br>Mandatory: No<br>Quantity: Zero or more<br>    Aligned(8) class ISOFileBoundaryBox extends Box('isfb') {<br>        unsigned int(16)    sequence_no;<br>    } |

The following Table 49 shows syntax representation of ISOFileBoundaryBox in the MP4 pseudo-code format.

TABLE 49

| ByteRangesBox |
| --- |
| Box Type: 'isfb'<br>Container: 'frbd'<br>Mandatory: No<br>Quantity: Zero or more<br>    Aligned(8) class ByteRangesBox extends Box('brag') {<br>        for (i=1;  ; i++) {<br>           unsigned int(32)    start;<br>           unsigned int(32)    end;<br>        }<br>    } |

Figure 4:
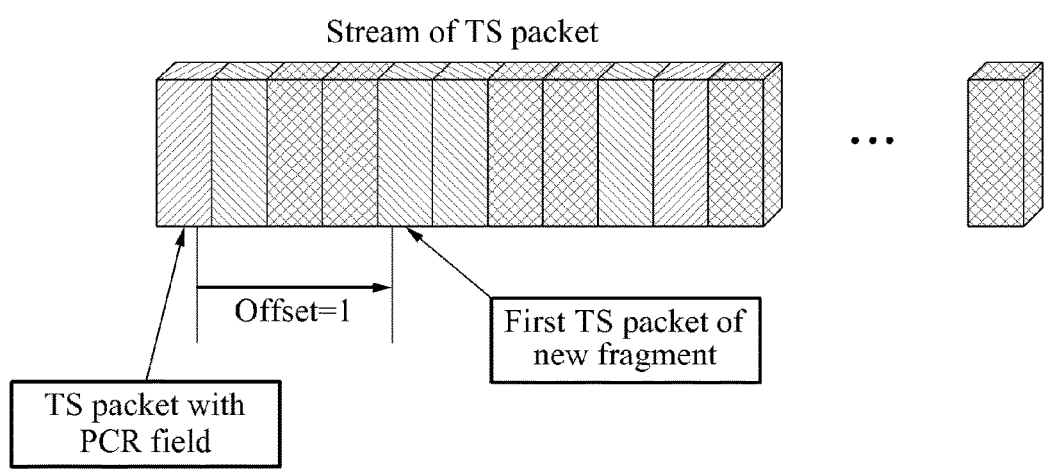
FIG. 4 is a diagram illustrating detection of virtual boundaries in a Moving Picture Experts Group-2 Transport Stream (MPEG-2 TS) according to an embodiment of the present invention.

FIG. 4 is a diagram illustrating detecting of virtual boundaries in an MPEG-2 TS according to an embodiment of the present invention.

In a TS, PCR packets of a given program may be carried with fixed PIDs (namely, PCR_PID), and may be inserted at least every 100 ms.

The PCT packets (with increasing values) may be considered as anchor points of the program. On the other hand, each media of a program may be carried by packets of a given PID (namely, Media_PID).

Accordingly, a fragment boundary of a media stream may be defined or identified by 1) a specific anchor point and 2) an offset from the anchor to the packet at the boundary.

The offset may be counted by the packets of the same Media_PID.

PCR values may be occasionally reset (discontinuity). For example, when one or more PCR packets have the same PCR value in an interval, an appearance order of PCR packets used as anchors may be indicated.

Accordingly, a fragment boundary of a media stream in a MPEG-2 TS may be identified by the following parameters in Table 50.

TABLE 50

| | |
|---|---|
| PCR_PID | Describes a PID carrying a PCR of a concerned content/program. |
| PCR_base | Describes a value of a PCR base field |
| PCR_ext | Describes a value of a PCR extension field |
| Appearance | Describes the appearance order (e.g., $1^{st}$, and $2^{nd}$) of the TS packet including the PCR value identified by the above two elements. If there is resetting/discontinuity of PCR, a PCR value may appear more than once during an interval. |
| Media_PID | Describes a PID of a media (e.g., video) of a program. |
| Media_Offset | Describes an offset (in TS packets of the same Media_PID) from the above identified PCR packet to the first media packet of a fragment. |

Hereinafter, Mapping and Extension of Several Syntax Elements in 3GPP Adaptive HTTP Streaming Schema Will be Described.

The 3GPP has enabled standardization of a standard for adaptive HTTP streaming Mapping of several syntax elements described above into the schema of 3GPP adaptive HTTP streaming is shown.

Several other different syntax may be used to represent ideas in the following embodiment.

In the above schema, the term "period" may be equal to the term "interval" discussed above. Semantics of added elements/attributes are provided in Table 51.

TABLE 51

| | |
|---|---|
| PeriodsRef | Equivalent to IntervalsRef element in the syntax. Child elements (Location, startTime, and availableTime) are already defined in the table. To make it consistent with change of Period's start/duration attributes, the same duration attribute of Period may be used in PeriodsRef. |
| NextPeriodRef | Equivalent to PreviousIntervalsRef element in the syntax. |
| Previous-PeriodsRef | Equivalent to PreviousIntervalsRef in the syntax. |
| lastPeriodFlag | Equivalent to Last element in the syntax. |
| Quality | Equivalent to Utility element of AdaptationInfo (or QoSInfo) in the syntax. Quality element has the following two attributes: 1) name: describes a quality type (e.g., MOS, and PSNR). The name attribute has the type of QualityNameType. Semantics of quality names listed in QualityNameType are defined by classification scheme AdaptationQoSCS of MPEG-21 DIA. 2) value: describes a quality value. |
| requestPara | Equivalent to ReqQoSPara element in the syntax. The requestPara attribute is a text string with the format defined as follows. If the string does not start with "?," the string may be formed of a sequence of values separated by spaces. Each value indicates the order of an attribute of Representation that is used as a parameter in a query. A name and value of a query parameter |

TABLE 51-continued

| | |
|---|---|
| | are a name and value of a corresponding attribute. For example, if the string is "2 3" and the second and third attributes of the Representation are [ . . . with="320" height="240" . . . ], the query part may be "with=320&height=240." If the string starts with "?," an exact query string for a request of the given Representation may be provided, for example, "bandwidth=1000&with=320&height=240." URL encoding (as defined in RFC 2616) may be applied here to support special characters. Several special characters that will be defined below may be also used in the text string. |
| randAccess | Equivalent to RandAccess element in the syntax. The randAccess attribute is a text string that is formed of a sequence of values separated by spaces. Each value indicates the order of a segment of the Representation. Segments identified by the randAccess attribute may support random access. |

Furthermore, the semantics of the range attribute of UrlType may be extended to support multiple byte ranges, for example, "0-500, 1000-1500." Such a modification may enable the range attribute to be equivalent to ByteRanges element of the above syntax.

Additionally, a sourceURL attribute may be changed from required to optional. This is because baseURL already provides a complete URL. The sourceURL may be unnecessary.

The use of multiple byte ranges may provide flexibility in downloading "virtual segments." For example, a segment of a low frame rate (that is able to be used in a trickmode) may be extracted on-the-fly from a stream or an original segment.

In addition, to support using multiple URLs for a Representation, the following modifications may be applied to the schema of 3GPP Adaptive HTTP Streaming Hereinafter, Multiple Locations for the Same Resource/Content Will be Described.

Each level of description (a top-level, a Period level, and a Representation level) may provide only a single base URL for building absolute URLs from the description.

Multiple base URLs may be provided at each description level. Multiple base URLs may signal availability of resources at multiple locations.

Depending on an actual location of a client, the client may select one or more base URLs in a process of retrieving resources.

Such a modification may be implemented by different ways. One way may be to use an additional attribute called "morebaseURLs," or an element called "BaseURLs."

The attribute or element may be a string formed of multiple (base) URLs. The string may be separated by several special characters, for example ";" (namely, a semicolon and a space).

For example, when a semicolon or space appears within a URL, the semicolon or space may be encoded by the rules of RFC 2616.

The morebaseURLs attribute (or BaseURLs element) of a lower description level may override the same attribute (or element) of the higher description level.

For clarity, the morebaseURLs attribute and BaseURLs element may be restricted to be mutually exclusive. In other words, only a single type may exist in a whole description.

Another way may be to use a MoreBaseURL element of any URI type with multiple instances, where each instance provides a base URL.

The different ways may be merely examples of ideas for providing multiple base URLs. The ideas may be implemented in many other ways or even other languages.

Hereinafter, Multiple Locations for Resource/Content Components Will be Described.

Resource/content may be divided into one or more components/streams. Each of the one or more components/streams may be delivered from a location. The delivering may be supported by allowing multiple instances of an UrlTemplate element or a Url element set in SegmentInfoType. A modification "<xs:choice maxOccurs="unbounded">" in SegmentInfoType may be used for the above purpose.

The appearance order of a UrlTemplate instance or a Url set instance may indicate importance of "location/stream." A more important location may appear before a less important location. For example, a video Representation may include two streams (for example, a spatial base layer, and a spatial enhancement layer). Each of the two streams may be delivered from a location described by UrlTemplate. Subsequently, the first instance of UrlTemplate may be a location for the spatial base layer.

Moreover, multiple instances of InitialisationSegmentURL may be allowed. An $n^{th}$ instance of InitialisationSegmentURL may correspond to an $n^{th}$ instance of a location (by either the UrlTemplate element or the Url element set).

For example, when only a single instance of InitialisationSegmentURL exists, the instance may be used for all locations.

The following Tables 52 through 55 show the schema of 3 GPP AdaptiveHTTPStreaming.

TABLE 52

```
<?xml version="1.0" encoding="UTF-8"?>
<xs:schema
targetNamespace="urn:3GPP:ns:PSS:AdaptiveHTTPStreamingMPD:2009"
    attributeFormDefault="unqualified"
    elementFormDefault="qualified"
    xmlns:xs="http://www.w3.org/2001/XMLSchema"
    xmlns="urn:3GPP:ns:PSS:AdaptiveHTTPStreamingMPD:2009">
    <xs:annotation>
        <xs:appinfo>Media Presentation Description</xs:appinfo>
        <xs:documentation xml:lang="en">
            This Schema defines 3GPP Media Presentation Description!
        </xs:documentation>
    </xs:annotation> <!-- MPD: main element -->
    <xs:element name="MPD" type="MPDtype"/>
<!-- MPD Type -->
<xs:complexType name="MPDtype">
    <xs:sequence>
        <xs:element minOccurs="0" name="ProgramInformation"
type="ProgramInformationType"/>
        <xs:choice maxOccurs="unbounded">
            <xs:element name="Period" type="PeriodType"/>
            <xs:element name="PeriodsRef" type="PeriodsRefType"/>
        </xs:choice>
        <xs:element minOccurs="0" name="BaseUrls" type="xs:string"/>
        <xs:element minOccurs="0" maxOccurs="unbounded"
            name="MoreBaseUrl"
type="xs:anyURI"/>
        <xs:any namespace="##other" processContents="lax" minOccurs="0"
maxOccurs="unbounded"/>
    </xs:sequence>
    <xs:attribute default="OnDemand" name="type"
type="PresentationType"/>
    <xs:attribute name="availabilityStartTime" type="xs:dateTime"/>
    <xs:attribute name="availabilityEndTime" type="xs:dateTime"/>
    <xs:attribute name="mediaPresentationDuration" type="xs:duration"/>
    <xs:attribute name="minimumUpdatePeriodMPD" type="xs:duration"/>
    <xs:attribute name="minBufferTime" type="xs:duration"
    use="required"/>
    <xs:attribute name="timeShiftBufferDepth" type="xs:duration"/>
    <xs:attribute name="baseUrl" type="xs:anyURI"/>
    <xs:attribute name="morebaseUrls" type="xs:string"/>
    <xs:anyAttribute namespace="##other" processContents="lax"/>
</xs:complexType>
<xs:complexType name="PeriodsRefType">
```

TABLE 52-continued

```
    <xs:sequence>
        <xs:element name="Location" type="xs:anyURI"/>
    </xs:sequence>
    <xs:attribute name="startTime" type="xs:duration"/>
    <xs:attribute name="duration" type="xs:duration"/>
    <xs:attribute name="availableTime" type="xs:duration"/>
</xs:complexType>>
```

TABLE 53

```
<!-- Type of presentation - live or on-demand -->
<xs:simpleType name="PresentationType">
    <xs:restriction base="xs:string">
        <xs:enumeration value="OnDemand"/>
        <xs:enumeration value="Live"/>
    </xs:restriction>
</xs:simpleType>
<!-- Period of a presentation -->
<xs:complexType name="PeriodType">
    <xs:sequence>
        <xs:element minOccurs="0" name="SegmentInfoDefault"
type="SegmentInfoDefaultType"/>
        <xs:element maxOccurs="unbounded" name="Representation"
type="RepresentationType"/>
        <xs:element minOccurs="0" name="PreviousPeriodsRef"
            type="xs:PeriodsRef"/>
        <xs:element minOccurs="0" name="NextPeriodsRef"
            type="xs:PeriodsRef"/>
        <xs:any namespace="##other" processContents="lax"
            minOccurs="0"
maxOccurs="unbounded"/>
    </xs:sequence>
    <xs:attribute name="start" type="xs:duration"/>
    <xs:attribute default="false" name="segmentAlignmentFlag"
type="xs:boolean"/>
    <xs:attribute default="false" name="bitStreamSwitchingFlag"
type="xs:boolean"/>
    <xs:attribute default="false" name="lastPeriodFlag"
type="xs:boolean"/>
    <xs:anyAttribute namespace="##other" processContents="lax"/>
</xs:complexType>
<!-- Program information for a presentation -->
<xs:complexType name="ProgramInformationType">
    <xs:sequence>
        <xs:element minOccurs="0" name="Title" type="xs:string"/>
        <xs:element minOccurs="0" name="Source" type="xs:string"/>
        <xs:element minOccurs="0" name="Copyright" type="xs:string"/>
        <xs:any namespace="##other" processContents="lax"
            minOccurs="0"
maxOccurs="unbounded"/>
    </xs:sequence>
    <xs:attribute name="moreInformationURL" type="xs:anyURI"/>
    <xs:anyAttribute namespace="##other" processContents="lax"/>
</xs :complexType>
```

TABLE 54

```
<!-- Default Segment access information -->
<xs:complexType name="SegmentInfoDefaultType">
    <xs:sequence>
        <xs:element minOccurs="0" name="BaseUrls" type="xs:string"/>
        <xs:element minOccurs="0" maxOccurs="unbounded"
            name="MoreBaseUrl"
type="xs:anyURI"/>
        <xs:any namespace="##other" processContents="lax"
            minOccurs="0"
maxOccurs="unbounded"/>
    </xs:sequence>
    <xs:attribute name="baseURL" type="xs:anyURI">
    <xs:attribute name="morebaseUrls" type="xs:string"/>
    <xs:attribute name="duration" type="xs:duration"/>
    <xs:attribute name="sourceUrlTemplatePeriod" type="xs:string"/>
    <xs:anyAttribute namespace="##other" processContents="lax"/>
</xs:complexType>
<!-- A Representation of the presentation content for a
```

TABLE 54-continued

```
specific Period -->
<xs:complexType name="RepresentationType">
    <xs:sequence>
        <xs:element name="SegmentInfo" type="SegmentInfoType"/>
        <xs:element minOccurs="0" name="ContentProtection"
type="ContentProtectionType"/>
        <xs:element minOccurs="0" name="TrickMode"
            type="TrickModeType"/>
        <xs:element minOccurs="0" maxOccurs="unbounded"
            name="Quality"
type="QualityType"/>
        <xs:any namespace="##other" processContents="lax"
            minOccurs="0"
maxOccurs="unbounded"/>
    </xs:sequence>
    <xs:attribute name="bandwidth" type="xs:unsignedInt"
use="required"/>
        <xs:attribute default="0" name="group" type="xs:unsignedInt"/>
    <xs:attribute name="width" type="xs:unsignedInt"/>
    <xs:attribute name="height" type="xs:unsignedInt"/>
    <xs:attribute name="lang" type="xs:string"/>
    <xs:attribute name="mimeType" type="xs:string" use="required"/>
    <xs:attribute default="false" name="startWithRAP"
        type="xs:boolean"/>
    <xs:attribute name="qualityRanking" type="xs:unsignedInt"/>
    <xs:attribute name="requestPara" type="xs:string"/>
    <xs:anyAttribute namespace="##other" processContents="lax"/>
</xs:complexType>
<xs:complexType name="QualityType">
    <xs:sequence>
        <xs:any namespace="##other" processContents="lax"
            minOccurs="0"
maxOccurs="unbounded"/>
    </xs:sequence>
    <xs:attribute name="name" type="xs:QualityNameType"/>
    <xs:attribute name="value" type="xs:float"/>
</xs:complexType>
```

TABLE 55

```
<xs:simpleType name="QualityNameType">
    <xs:restriction base="xs:string">
        <xs:enumeration value="PSNR"/>
        <xs:enumeration value="MOS"/>
        <xs:enumeration value="ODG"/>
        <xs:enumeration value="DI"/>
    </xs:restriction>
</xs:simpleType>
<!-- Segment access information -->
<xs:complexType name="SegmentInfoType">
    <xs:sequence>
        <xs:element minOccurs="0" name="BaseUrls"
            type="xs:string"/>
        <xs:element minOccurs="0" maxOccurs="unbounded"
            name="MoreBaseUrl"
type="xs:anyURI"/>
        <xs:element minOccurs="0" maxOccurs="unbounded"
name="InitialisationSegmentURL" type="UrlType"/>
        <xs:choice maxOccurs="unbounded">
            <xs:element minOccurs="0" name="UrlTemplate"
                type="UrlTemplateType"/>
            <xs:sequence>
                <xs:element maxOccurs="unbounded" name="Url"
                    type="UrlType"/>
                <xs:any namespace="##other" processContents="lax"
                    minOccurs="0"
maxOccurs="unbounded"/>
            </xs:sequence>
            <xs:any namespace="##other" processContents="lax"
                minOccurs="0"
maxOccurs="unbounded"/>
        </xs:choice>
    </xs:sequence>
    <xs:attribute name="baseURL" type="xs:anyURI">
    <xs:attribute name="morebaseUrls" type="xs:string"/>
    <xs:attribute name="duration" type="xs:duration"/>
    <xs:attribute name="randAccess" type="xs:string"/>
```

TABLE 55-continued

```
    <xs:anyAttribute namespace="##other" processContents="lax"/>
</xs:complexType>
<!-- A Segment URL -->
<xs:complexType name="UrlType">
    <xs:sequence>
        <xs:any namespace="##other" processContents="lax"
            minOccurs="0"
maxOccurs="unbounded"/>
    </xs:sequence>
    <xs:attribute name="sourceURL" type="xs:anyURI"
        use="optional"/>
    <xs:attribute name="range" type="xs:string"/>
    <xs:anyAttribute namespace="##other" processContents="lax"/>
</xs:complexType>
```

TABLE 56

```
<!-- A URL template -->
<xs:complexType name="UrlTemplateType">
    <xs:sequence>
        <xs:any namespace="##other" processContents="lax"
            minOccurs="0"
maxOccurs="unbounded"/>
    </xs:sequence>
    <xs:attribute name="sourceURL" type="xs:anyURI"/>
    <xs:attribute name="id" type="xs:string"/>
    <xs:attribute default="1" name="startIndex"
        type="xs:unsignedInt"/>
    <xs:attribute name="endIndex" type="xs:unsignedInt"/>
    <xs:anyAttribute namespace="##other"
        processContents="lax"/>
</xs:complexType>
<!-- Gives information about the content protection -->
<xs:complexType name="ContentProtectionType">
    <xs:sequence>
        <xs:element minOccurs="0" name="SchemeInformation"
            type="xs:string"/>
        <xs:any namespace="##other" processContents="lax"
            minOccurs="0"
maxOccurs="unbounded"/>
    </xs:sequence>
    <xs:attribute name="schemeIdUri" type="xs:anyURI">
    <xs:anyAttribute namespace="##other"
        processContents="lax"/>
</xs:complexType>
<!-- Gives information about trick mode -->
<xs:complexType name="TrickModeType">
    <xs:sequence>
        <xs:any namespace="##other" processContents="lax"
            minOccurs="0"
maxOccurs="unbounded"/>
    </xs:sequence>
    <xs:attribute name="alternatePlayoutRate" type="xs:string"/>
    <xs:anyAttribute namespace="##other"
        processContents="lax"/>
</xs:complexType>
</xs:schema>
```

Hereinafter, Several Other Options of a PeriodsRef Element Will be Described.

XInclude may be a World Wide Web Consortium (W3C) technology that provides an inclusion mechanism used to merge XML documents.

The above PeriodsRef and XInclude may be similar in using any URI type (with the Location element and href attribute) to refer to a resource/description. However, there are major differences between the above two approaches.

XInclude may be used to merge XML documents. In other words, the merged documents may need to be obtained before being optionally further processed. Conversely, PeriodsRef may be used to refer to past or future periods. The past or future periods may not always need to be merged. The intention of PeriodsRef may be to allow a user to retrieve appropriate period information only when the user wants.

In association with specific attributes/elements, startTime and availableTime of PeriodsRef may be unique for retrieval of period information. Among the attributes/elements of XInclude, "fallback" and "xpointer" may be used to improve functionality of PeriodsRef, while "parse", "encoding", "accept", and "accept-language" may be unnecessary for PeriodsRef.

Based on the above description, two additional options for referencing periods may be proposed: 1) enhanced PeriodsRef, and 2) XInclude-extending PeriodsRef.

Enhanced PeriodsRef: enables enhancement of existing PeriodsRef by the fallback element and xpointer attribute of XInclude. This option may have an advantage of simplicity in syntax and processing. The syntax of modified PeriodsRef may be provided in Table 57 below.

XInclude-extending PeriodsRef: enables building of PeriodsRef by simply extending XInclude with startTime and availableTime attributes. This option may have an advantage of the use of the standard XInclude. To avoid always merging documents initially, the semantics of PeriodsRef may need to mandate that "clients are allowed to decide whether merging needs to be completed." The syntax of PeriodsRef may be provided in Table 58 below.

In the above syntax, an ids attribute may be added to indicate ids of referenced Periods used in the current media presentation. Additionally, to have consistency with a href attribute of XInclude, the Location element may be changed to an optional location attribute.

TABLE 57

```
<xs:complexType name="PeriodsRefType">
  <xs:choice minOccurs="0" maxOccurs="unbounded">
    <xs:element minOccurs="0" maxOccurs="unbounded"
      name="fallback"
```

TABLE 57-continued

```
type="fallbackType"/>
    <xs:any namespace="##other" processContents="lax" minOccurs="0"
maxOccurs="unbounded"/>
  </xs:choice>
  <xs:attribute name="ids" type="xs:string"/>
  <xs:attribute name="location" type="xs:anyURI">
  <xs:attribute name="xpointer" type="xs:string"/>
  <xs:attribute name="startTime" type="xs:duration"/>
  <xs:attribute name="availableTime" type="xs:duration"/>
  <xs:anyAttribute namespace="##other" processContents="lax"/>
</xs:complexType>
<xs:complexType name="fallbackType">
  <xs:choice minOccurs="0" maxOccurs="unbounded">
    <xs:element name="PeriodsRef" type="PeriodsRefType"/>
    <xs:any namespace="##other" processContents="lax"/>
  </xs:choice>
  <xs:anyAttribute namespace="##other" processContents="lax" />
</xs:complexType>
```

TABLE 58

```
<xs:schema
...
  xmlns:xi="http://www.w3.org/2001/XInclude"
...
<xs:complexType name="PeriodsRefType">
  <xs:complexContent>
    <xs:extension base="xi:includeType">
      <xs:attribute name="ids" type="xs:string"/>
      <xs:attribute name="startTime" type="xs:duration"/>
      <xs:attribute name="availableTime" type="xs:duration"/>
      <xs:anyAttribute namespace="##other" processContents="lax"/>
    </xs:extension>
  </xs:complexContent>
</xs:complexType>
```

The semantics of the above elements/attributes may be provided as shown in Table 59.

TABLE 59

| Element or Attribute Name | Type (Attribute or Element) | Cardinality | Optionality | Description |
| --- | --- | --- | --- | --- |
| MPD | E | 1 | M | Describes a root element that carries a Media Presentation Description (MPD) for a Media Presentation. |
| ... | | | | |
| Period | E | 1 . . . N | O | Provides information of Period. |
| PeriodsRef | E | 1 . . . N | O | Provides reference to description containing one or more instances of Period element. One or more instances of Period element represent a sequence of consecutive Period(s). The information of Period may be either included as an instance of Period element or referenced by PeriodsRef element. |
| ids | A | | O. | Provides id(s) of referenced Period(s). When multiple consecutive Periods are referenced, the id's conveyed by this string are separated by semicolon. |
| locatoin | A | | O. | Provides reference to description of Period(s). |
| xpointer | A | | O. | Provides an XPointer to identify a portion of the referenced description. If xpointer attribute is absent, location attribute needs to be present. |
| startTime | A | 0 . . . 1 | O. | Indicates the start time of the referenced sequence of Periods, relative to the start time of content. StartTime element may help a client to determine whether referenced information needs to be retrieved. |

TABLE 59-continued

| Element or Attribute Name | Type (Attribute or Element) | Cardi- nality | Option- ality | Description |
|---|---|---|---|---|
| availableTime | A | 0 ... 1 | O. | Indicates the time the description of referenced Period(s) is available. The time is the relative time from the start time of content. If availableTime attribute is absent, the description is already available. |

Hereinafter, Period Timeline Will be Described.

Each period may have a start attribute indicating a start time of a period. However, the above approach may not be flexible in modifying a timeline of periods.

For example, to insert an advertisement period into an MPD for VOD, start times of all periods after the inserted period need to be modified. Furthermore, when the same advertisement period is played repeatedly (for example, every 1 hour), the period may be continuously inserted. In the same manner, when one or more periods are removed from an MPD, start times of remaining periods after periods are removed in space time may be modified.

In the embodiment, for flexibility of period management, the following modifications may be proposed:

1) Add a new attribute called "duration" to a Period
2) Change a current start attribute of a Period to optional
3) Add a new element called PeriodTimeline to the MPD type The PeriodTimeline element may provide information about presentation of periods based on a timeline. Semantics and syntax of the PeriodTimeline element may be provided in Tables 60 through 62 below.

Using PeriodTimeline, description of a Period may be independent of a presentation time. Accordingly, a Period may be reused (fully or partially) in the same media presentation or in another media presentation. To modify the presentation time, only the Period Timeline needs to be changed.

In addition, the PartialPlay element may allow (re)play of one or more parts of a Period. For example, after an advertisement Period is presented, a part of the advertisement Period (denoted by beginning and ending) may be occasionally repeated during the whole session.

The PeriodTimeline element may impose an explicit timeline of Periods. Without the PeriodTimeline element, the implicit timeline of Periods may be inferred from the ordered sequence of Periods. To support the replay of a Period in the case of implicit timeline, the PartialPlay element may also be provided as a child element of the Period element.

TABLE 60

| Element or Attribute Name | Type (Attribute or Element) | Cardin- ality | Option- ality | Description |
|---|---|---|---|---|
| MPD | E | 1 | M | Describes a root element that carries a Media Presentation Description (MPD) for a Media Presentation. |
| ... | | | | |
| PeriodTimeline | E | 0 ... 1 | O | Provides the presentation timeline of Periods of the Media Presentation. |
| PeriodsTime | E | 1 ... N | O | Provides time information for presenting Period. |
| id | A | | O. | Indicates an id of Period of the Media Presentation. This value is equal to the value of the id attribute of Period, if the id attribute of Period is present. If no id attributes are present, this value is equal to the appearance order of Period in the MPD. |
| start | A | | O. | Provides accurate start time of Period relative to the value of the attribute availabilityStart time of the Media Presentation. The start attribute overrides start attribute of corresponding Period (i.e., an instance of Period element). The start attribute may be present for the first Period of the timeline. For other Periods, if information about presentation duration of previous Periods is available, this value may be deduced and the attribute may be absent. |
| PartialPlay | E | 0 ... N | O. | Provides information for presenting a (temporal) part of Period. |
| beginning | A | | O. | Indicates a beginning point of a part of Period. This time value is relative to the beginning of the Period. |
| ending | A | | O. | Indicates an ending point of a part of Period. This time value is relative to the beginning of the Period. |

TABLE 60-continued

| Element or Attribute Name | Type (Attribute or Element) | Cardinality | Optionality | Description |
|---|---|---|---|---|
| Period | E | 1 ... N | M | Provides information of Period. |
| start | A | | O | |
| id | A | | O | Indicates an ID of Period. When the Period is a (partial) repeat of another Period, the value of id attribute is equal to an ID or an appearance order of a referred Period. |
| duration | A | | O. | Indicates duration of Period. If start attribute is absent, duration attribute may be present. Also, for the last Period of a Media Presentation, if availabilityEndTime and SegmentTimeline are not available, the duration attribute of the Period may be present. |
| PartialPlay | E | 0 ... N | O. | Provides information for presenting a (temporal) part of Period. |
| beginning | A | | O. | Indicates a beginning point of a part of Period. This time value is relative to the beginning of the Period. |
| ending | A | | O. | Indicates an ending point of a part of Period. This time value is relative to the beginning of the Period. |
| Representation | E | 0 ... N | | Representation element contains description of Representation. |

TABLE 61

```
<?xml version="1.0" encoding="UTF-8"?>
<xs:schema
targetNamespace="urn:3GPP:ns:PSS:AdaptiveHTTPStreamingMPD:2009"
    attributeFormDefault="unqualified"
    elementFormDefault="qualified"
    xmlns:xs="http://www.w3.org/2001/XMLSchema"
    xmlns="urn:3GPP:ns:PSS:AdaptiveHTTPStreamingMPD:2009">
...
<!-- MPD Type -->
<xs:complexType name="MPDtype">
    <xs:sequence>
        <xs:element minOccurs="0" name="ProgramInformation"
type="ProgramInformationType"/>
        <xs:element minOccurs="0" name="PeriodTimeline"
type="PeriodTimelineType"/>
        <xs:element maxOccurs="unbounded" name="Period"
type="PeriodType"/>
        <xs:any namespace="##other" processContents="lax"
minOccurs="0"
maxOccurs="unbounded"/>
    </xs:sequence>
    <xs:attribute default="OnDemand" name="type"
type="PresentationType"/>
    <xs:attribute name="availabilityStartTime"
type="xs:dateTime"/>
    <xs:attribute name="availabilityEndTime"
type="xs:dateTime"/>
    <xs:attribute name="mediaPresentationDuration"
type="xs:duration"/>
    <xs:attribute name="minimumUpdatePeriodMPD"
type="xs:duration"/>
    <xs:attribute name="minBufferTime" type="xs:duration"
use="required"/>
    <xs:attribute name="timeShiftBufferDepth" type="xs:duration"/>
    <xs:attribute name="baseUrl" type="xs:anyURI"/>
    <xs:anyAttribute namespace="##other" processContents="lax"/>
</xs:complexType>
<!-- Type of presentation - live or on-demand -->
<xs:simpleType name="PresentationType">
    <xs:restriction base="xs:string">
        <xs:enumeration value="OnDemand"/>
        <xs:enumeration value="Live"/>
    </xs:restriction>
</xs:simpleType>
<!-- Period Timeline -->
<xs:complexType name="PeriodTimelineType">
```

TABLE 61-continued

```
    <xs:sequence>
        <xs:element maxOccurs="unbounded" name="PeriodTime"
type="PeriodTimeType"/>
        <xs:any namespace="##other" processContents="lax"
minOccurs="0"
maxOccurs="unbounded"/>
    </xs:sequence>
    <xs:anyAttribute namespace="##other" processContents="lax"/>
</xs:complexType>
```

TABLE 62

```
<xs:complexType name="PeriodTimeType">
    <xs:sequence>
        <xs:element minOccurs="0" maxOccurs="unbounded"
name="PartialPlay"
type="PartialPlayType"/>
        <xs:any namespace="##other" processContents="lax"
minOccurs="0"
maxOccurs="unbounded"/>
    </xs:sequence>
    <xs:attribute name="id" type="xs:string" use="required"/>
    <xs:attribute name="start" type="xs:duration"/>
    <xs:anyAttribute namespace="##other" processContents="lax"/>
</xs:complexType>
<xs:complexType name="PartialPlayType">
    <xs:sequence>
        <xs:any namespace="##other" processContents="lax"
minOccurs="0"
maxOccurs="unbounded"/>
    </xs:sequence>
    <xs:attribute name="beginning" type="xs:duration"/>
    <xs:attribute name="ending" type="xs:duration"/>
    <xs:anyAttribute namespace="##other" processContents="lax"/>
</xs:complexType>
<!-- Period of a presentation -->
<xs:complexType name="PeriodType">
    <xs:sequence>
        <xs:element minOccurs="0" name="SegmentInfoDefault"
type="SegmentInfoDefaultType"/>
        <xs:element minOccurs="0" maxOccurs="unbounded"
name="PartialPlay"
```

TABLE 62-continued

```
type="PartialPlayType"/>
    <xs:element minOccurs="0" maxOccurs="unbounded"
    name="Representation"
type="RepresentationType"/>
    <xs:any namespace="##other" processContents="lax"
```

Each supplementary item may be provided for the highest resolution of content. For example, when content is downscaled to several small terminals, a supplementary item and location parameters (xOffset, and yOffset) of the supplementary item may also be downscaled proportionally.

Semantics and syntax of SupplementaryInfo may be provided in Tables 63 through 65.

TABLE 63

| Element or Attribute Name | Type (Attribute or Element) | Cardinality | Optionality | Description |
|---|---|---|---|---|
| MPD | E | 1 | M | Describes a root element that carries a Media Presentation Description (MPD) for a Media Presentation. |
| ... | | | | |
| SupplementaryInfo | E | 0 ... 1 | O | Provides supplementary information and presentation of the supplementary information for the Media Presentation. |
| SupplementaryItem | E | 1 ... N | M | Provides a supplementary item and presentation of the supplementary item for the Media Presentation. |
| itemURL | A | | O. | Provides a URL of the supplementary item. |
| mime | A | | O. | Provides MIME type of the item. |
| Presentation | E | 0 ... N | O. | Provides information for presenting the item. If both On and Off elements are absent, the item is always presented. The On and Off elements may appear alternatively. |
| On | E | 0 ... N | O. | Indicates time duration where the supplementary item is presented. |
| Off | E | 0 ... N | O. | Indicates time duration where the supplementary item is not presented. |
| xOffset | A | | O | Indicates a horizontal location of the item on a screen of a client. The horizontal location is counted in pixels, and is relative to the top left corner. |
| yOffset | A | | O | Indicates a vertical location of the item on a screen of a client. The vertical location is counted in pixels, and is relative to the top left corner. |
| transparency | A | | | Indicates the transparency degree (%) of the supplementary item. |

TABLE 62-continued

```
    minOccurs="0"
maxOccurs="unbounded"/>
    </xs:sequence>
    <xs:attribute name="start" type="xs:duration"/>
    <xs:attribute name="duration" type="xs:duration"/>
    <xs:attribute name="id" type="xs:string"/>
    <xs:attribute default="false" name="segmentAlignmentFlag"
    type="xs:boolean"/>
    <xs:attribute default="false" name="bitStreamSwitchingFlag"
    type="xs:boolean"/>
    <xs:anyAttribute namespace="##other" processContents="lax"/>
</xs:complexType>
...
...
</xs:schema>
```

As no a repeated Period needs to contain representation description again, the minimum number of Representation instances may also be changed to 0.

Rather than using the id attribute directly, a special attribute indicating an id value of a previous Period to be repeated may be used.

Hereinafter, Supplementary Info Will be Described.

To provide a professional service, a provider may need clients to present supplementary information (together with main content), such as a provider's logo or advertisement banners. The supplementary information may be independent of the timeline of the Period.

TABLE 64

```
<?xml version="1.0" encoding="UTF-8"?>
<xs:schema
targetNamespace="urn:3GPP:ns:PSS:
AdaptiveHTTPStreamingMPD:2009"
    attributeFormDefault="unqualified"
    elementFormDefault="qualified"
    xmlns:xs="http://www.w3.org/2001/XMLSchema"
    xmlns="urn:3GPP:ns:PSS:
    AdaptiveHTTPStreamingMPD:2009">
...
<!-- MPD Type -->
<xs:complexType name="MPDtype">
    <xs:sequence>
        <xs:element minOccurs="0" name="ProgramInformation"
        type="ProgramInformationType"/>
        "ProgramInformation"
        <xs:element minOccurs="0" name="SupplementaryInfo"
        type="SupplementaryInfoType"/>
        <xs:element maxOccurs="unbounded" name="Period"
        type="PeriodType"/>
        <xs:any namespace="##other" processContents="lax"
            minOccurs="0"
    maxOccurs="unbounded"/>
    </xs:sequence>
    <xs:attribute default="OnDemand" name="type"
    type="PresentationType"/>
    <xs:attribute name="availabilityStartTime"
    type="xs:dateTime"/>
    <xs:attribute name="availabilityEndTime"
    type="xs:dateTime"/>
```

TABLE 64-continued

```
    <xs:attribute name="mediaPresentationDuration"
type="xs:duration"/>
    <xs:attribute name="minimumUpdatePeriodMPD"
type="xs:duration"/>
    <xs:attribute name="minBufferTime" type="xs:duration"
use="required"/>
    <xs:attribute name="timeShiftBufferDepth"
type="xs:duration"/>
    <xs:attribute name="baseUrl" type="xs:anyURI">
    <xs:anyAttribute namespace="##other"
processContents="lax"/>
</xs:complexType>
<!-- Type of presentation - live or on-demand -->
<xs:simpleType name="PresentationType">
    <xs:restriction base="xs:string">
        <xs:enumeration value="OnDemand"/>
        <xs:enumeration value="Live"/>
    </xs:restriction>
</xs:simpleType>
<!-- Supplementary Info -->
<xs:complexType name="SupplementaryInfoType">
    <xs:sequence>
        <xs:element maxOccurs="unbounded"
name="SupplementaryItem"
type="SupplementaryItemType"/>
        <xs:any namespace="##other" processContents="lax"
minOccurs="0"
maxOccurs="unbounded"/>
    </xs:sequence>
    <xs:anyAttribute namespace="##other"
processContents="lax"/>
</xs:complexType>
```

TABLE 65

```
<xs:complexType name="SupplementaryItemType">
    <xs:sequence>
        <xs:element minOccurs="0" name="Presentation"
type="PresentationType"/>
        <xs:any namespace="##other" processContents="lax"
minOccurs="0"
maxOccurs="unbounded"/>
    </xs:sequence>
    <xs:attribute name="itemURL" type="xs:anyURL">
    <xs:attribute name="mime" type="xs:string"/>
    <xs:anyAttribute namespace="##other"
processContents="lax"/>
</xs:complexType>
<xs:complexType name="PresentationType">
    <xs:sequence>
        <xs:choice minOccurs="0" maxOccurs="unbounded">
            <xs:element name="On" type="xs:duration"/>
            <xs:element name="Off" type="xs:duration"/>
            <xs:any namespace="##other"
processContents="lax" minOccurs="0"
```

TABLE 65-continued

```
maxOccurs="unbounded"/>
        </xs:choice>
        <xs:sequence>
        <xs:attribute name="xOffset" type="xs:unsignedInt"/>
        <xs:attribute name="yOffset" type="xs:unsignedInt"/>
        <xs:attribute name="transparency"
type="xs:unsignedInt"/>
        <xs:anyAttribute namespace="##other"
processContents="lax"/>
</xs:complexType>
<!-- Period of a presentation -->
<xs:complexType name="PeriodType">
    <xs:sequence>
        <xs:element minOccurs="0"
name="SegmentInfoDefault"
type="SegmentInfoDefaultType"/>
        <xs:element maxOccurs="unbounded"
name="Representation"
type="RepresentationType"/>
        <xs:any namespace="##other"
processContents="lax" minOccurs="0"
maxOccurs="unbounded"/>
    </xs:sequence>
    <xs:attribute name="start" type="xs:duration"/>
    <xs:attribute name="duration" type="xs:duration"/>
    <xs:attribute name="id" type="xs:string"/>
    <xs:attribute default="false"
name="segmentAlignmentFlag" type="xs:boolean"/>
    <xs:attribute default="false"
name="bitStreamSwitchingFlag" type="xs:boolean"/>
    <xs:anyAttribute namespace="##other"
processContents="lax"/>
</xs:complexType>
...
...
</xs:schema>
```

Hereinafter, Definitions of a Buffering Amount Will be Described.

A minimum amount of initially buffered media of a client may be defined in time unit. In several cases, it is difficult for a client to make sure a temporal duration of buffered media is enough. Another option may be provided to enable the initially buffered media to be specified in data size unit.

For example, when two options (namely, the time unit, and the data size unit) are provided at the same time, a provider may specify a priority for each of the two options. The client may select an option from the two options.

The above idea may be implemented by adding another optional attribute called minBufferSize to the MPD, as shown in Tables 66 and 67 below. At least one of the two attributes (minBufferTime, and minBufferSize) may need to be present.

Table 66 shows semantics of minBufferSize.

TABLE 66

| Element or Attribute Name | Use | Description |
| --- | --- | --- |
| MPD | 1 | Describes a root element that carries a Media Presentation Description (MPD) for a Media Presentation. |
| . . . | | |
| minBufferTime | Optional | Provides the minimum amount of initially buffered media that is needed to ensure smooth playout provided that each Representation is delivered at or above a bandwidth value of the Representation. The bandwidth value of the Representation corresponds to this amount of buffered media. The value of this attribute is represented in time duration. |

TABLE 66-continued

| Element or Attribute Name | Use | Description |
| --- | --- | --- |
| minBufferSize | Optional | Provides the minimum amount of initially buffered media that is needed to ensure smooth playout provided that each Representation is delivered at or above a bandwidth value of the Representation. The bandwidth value of the Representation corresponds to this amount of buffered media. The value of this attribute is represented in datasize (kilo byte). |

TABLE 67

```
<?xml version="1.0" encoding="UTF-8"?>
<xs:schema
targetNamespace="urn:3GPP:ns:PSS:AdaptiveHTTPStreamingMPD:2009"
    attributeFormDefault="unqualified"
    elementFormDefault="qualified"
    xmlns:xs="http://www.w3.org/2001/XMLSchema"
    xmlns="urn:3GPP:ns:PSS:AdaptiveHTTPStreamingMPD:2009">
... ...
    <xs:complexType name="MPDtype">
        <xs:sequence>
            <xs:element name="ProgramInformation"
type="ProgramInformationType"
minOccurs="0"/>
            <xs:element name="Period" type="PeriodType"
maxOccurs="unbounded"/>
            <xs:element name="BaseURL" type="BaseURLType"
minOccurs="0"
maxOccurs="unbounded"/>
            <!-- NEW: Alternate base URL specifications -->
            <xs:any namespace="##other"
processContents="lax" minOccurs="0" process
maxOccurs="unbounded"/>
        </xs:sequence>
        <xs:attribute name="type" type="PresentationType"
default="OnDemand"/>
        <xs:attribute name="availabilityStartTime" type="xs:dateTime"/>
        <xs:attribute name="availabilityEndTime" type="xs:dateTime"/>
        <xs:attribute name="mediaPresentationDuration"
type="xs:duration"/>
        <xs:attribute name="minimumUpdatePeriodMPD"
type="xs:duration"/>
        <xs:attribute name="minBufferTime" type="xs:duration"
use="optional"/>
        <xs:attribute name="minBufferSize" type="xs:unsignedInt"
use="optional"/>
        <xs:attribute name="timeShiftBufferDepth" type="xs:duration"/>
        <xs:attribute name="baseURL" type="xs:anyURI">
        <xs:anyAttribute namespace="##other" processContents="lax"/>
```

TABLE 67-continued

```
    </xs:complexType>
...
</xs:schema>
```

Hereinafter, Bandwidth Information for Different Amounts of Initially Buffered Media Will be Described.

Bandwidth information of each representation may be provided for a given minimum amount of initially buffered media. However, different clients may have different pre-set amounts of initially buffered media, and accordingly different bandwidth information may be required for different clients.

Hereinafter, Different Bandwidth Values Corresponding to Different Minimum Amounts of Initially Buffered Media Will be Described for Each Representation.

An advantage of such a solution may be that multiple MPDs corresponding to multiple minimum amounts of initially buffered media are not required.

Accordingly, a schema of MPEG DASH may be changed as follows:

1) More values may be added to the MPD for minimum amounts of initially buffered media. As described above, the amount of buffering may be either in the time unit or data size unit.

2) For each representation, bandwidth values corresponding to the minimum amounts of initially buffered media may be provided.

The above changes may be implemented by the MinBuffer element in MPDtype or the BandwidthInfo@repBandwidth element in RepresentationType.

Table 68 shows semantics of MinBuffer.

TABLE 68

| Element or Attribute Name | Use | Description |
| --- | --- | --- |
| MPD | 1 | Describes a root element that carries a Media Presentation Description (MPD) for a Media Presentation. |
| . . . | | |
| BaseURL | 0 . . . N | Describes a URL that may be used on the MPD level, instead of baseURL attribute, or in addition to baseURL attribute. |
| MinBuffer | 0 . . . N | Provides a minimum amount of initially buffered media that is needed to ensure smooth playout. |
| id | M | Provides an ID of MinBuffer element.The value of this attribute may be greater than 0. |
| minBufferTime | Optional | Provides the minimum amount of initially buffered media that is needed to ensure smooth playout provided that each Representation is delivered at or above a bandwidth value of the Representation.The bandwidth value of the Representation corresponds to this amount of buffered media. The value of this attribute is represented in time duration. |
| minBufferSize | Optional | Provides the minimum amount of initially buffered media that is needed to ensure smooth playout provided that each Representation is delivered at or above a bandwidth value of the Representation. The bandwidth value of the Representation corresponds to this amount of buffered media. The value of this |

TABLE 68-continued

| Element or Attribute Name | Use | Description |
|---|---|---|
| | | attribute is represented in datasize (kilo byte). At least one attribute among minBufferTime and minBufferSize may be present in MinBuffer element. |

Table 69 shows semantics of BandwidthInfo

TABLE 69

| Element or Attribute Name | Use | Description |
|---|---|---|
| Representation | M | Representation element contains description of Representation. |
| ... | | |
| SegmentInfo | 1 | Provides Segment access information. |
| BandwidthInfo | 0 . . . N | Provides bandwidth information corresponding to a specific amount of initially buffered media. |
| id | M | Indicates an ID of MinBuffer element of the MPD. If the value of this attribute is 0, the value corresponds to the minimum amount of initially buffered media provided by minBufferTime or minBufferSize of the MPD. |
| repBandwidth | O | Provides a bandwidth value for the representation corresponding to the minimum amount of initially buffered media provided in the associated MinBuffer element. The repBandwidth attribute may be absent if the value of id attribute is 0. |

Tables 70 and 71 show XML syntax of Bandwidth Info.

TABLE 70

```
<?xml version="1.0" encoding="UTF-8"?>
<xs:schema
targetNamespace="urn:3GPP:ns:PSS:AdaptiveHTTPStreamingMPD:2009"
    attributeFormDefault="unqualified"
    elementFormDefault="qualified"
    xmlns:xs="http://www.w3.org/2001/XMLSchema"
    xmlns="urn:3GPP:ns:PSS:AdaptiveHTTPStreamingMPD:2009">
......
    <xs:complexType name="MPDtype">
        <xs:sequence>
            <xs:element name="ProgramInformation"
            type="ProgramInformationType" minOccurs="0"/>
            <xs:element name="Period" type="PeriodType"
            maxOccurs="unbounded"/>
            <xs:element name="BaseURL" type="BaseURLType"
            minOccurs="0" maxOccurs="unbounded"/>
            <xs:element name="MinBuffer" type="MinBufferType"
            minOccurs="0" maxOccurs="unbounded"/>
            <xs:any namespace="##other" processContents="lax"
            minOccurs="0" maxOccurs="unbounded"/>
        </xs:sequence>
        <xs:attribute name="type" type="PresentationType"
        default="OnDemand"/>
        <xs:attribute name="availabilityStartTime" type="xs:dateTime"/>
        <xs:attribute name="availabilityEndTime" type="xs:dateTime"/>
        <xs:attribute name="mediaPresentationDuration" type="xs:duration"/>
        <xs:attribute name="minimumUpdatePeriodMPD"
        type="xs:duration"/>
        <xs:attribute name="minBufferTime" type="xs:duration"
        use="optional"/>
        <xs:attribute name="minBufferSize" type="xs:unsignedInt"
        use="optional"/>
        <xs:attribute name="timeShiftBufferDepth" type="xs:duration"/>
        <xs:attribute name="baseUrl" type="xs:anyURI"/>
        <xs:anyAttribute namespace="##other" processContents="lax"/>
    </xs:complexType>
<xs:complexType name="MinBufferType">
    <xs:sequence>
```

TABLE 70-continued

```
        <xs:any namespace="##other" processContents="lax"
        minOccurs="0" maxOccurs="unbounded"/>
    </xs:sequence>
    <xs:attribute name="id" type="xs:string" use="required"/>
    <xs:attribute name="minBufferTime" type="xs:duration"/>
    <xs:attribute name="minBufferSize" type="xs:unsignedInt"/>
    <xs:anyAttribute namespace="##other" processContents="lax"/>
</xs:complexType>
...
```

TABLE 71

```
<xs:complexType name="RepresentationType">
    <xs:complexContent>
        <xs:extension base="RepresentationBaseType">
            <xs:sequence>
                <xs:element name="SegmentInfo" type="SegmentInfoType"/>
                <xs:element minOccurs="0" maxOccurs="unbounded"
                name="BandwidthInfo" type="BandwidthInfoType"/>
                <xs:element name="TrickMode" type="TrickModeType"
                minOccurs="0"/>
            </xs:sequence>
            <xs:attribute name="id" type="xs:string" use="required"/>
            <xs:attribute name="bandwidth" type="xs:unsignedInt"
            use="required"/>
            <xs:attribute name="qualityRanking" type="xs:unsignedInt"/>
            <xs:attribute name="depid" type="StringVectorType"/>
            <xs:attribute name="default" type="xs:boolean"/>
        </xs:extension>
    </xs:complexContent>
</xs:complexType>
<!-- Bandwidth Info -->
<xs:complexType name="BandwidthInfoType">
    <xs:sequence>
        <xs:any namespace="##other" processContents="lax" minOccurs="0"
        maxOccurs="unbounded"/>
    </xs:sequence>
    <xs:attribute name="id" type="xs:string"/>
```

TABLE 71-continued

```
      <xs:attribute name="repBandwidth" type="xs:unsignedInt"/>
      <xs:anyAttribute namespace="##other" processContents="lax"/>
</xs:complexType>
</xs:schema>
```

Hereinafter, a Segment Bandwidth Will be Described.

A bandwidth attribute may be provided for each representation over the whole duration of a period. However, for quality consistence, the bitrate of encoded video may usually have busty characteristics. A bitrate of one segment may be several times higher than a bitrate of another segment. Bandwidth information of each segment may be additionally provided, so that a client may more efficiently adapt to network variations.

Table 72 describes semantics of SegmentBandwidth.

TABLE 72

| Element or Attribute Name | Type (Attribute or Element) | Cardinality | Optionality | Description |
|---|---|---|---|---|
| MPD | E | 1 | M | Describes a root element that carries a Media Presentation Description (MPD) for a Media Presentation. |
| ... | | | | |
| Representation SegmentInfo | | | | |
| SegmentBandwidth | E | 0 ... 1 | O. | Provides bandwidth information for segments of a representation. |
| Range | E | 1 ... N | M. | Provides bandwidth information for a range of consecutive segments of a representation. The first range may start from the first segment of the representation. |
| offset | | | | Indicates a difference between a representation bandwidth and a segment bandwidth. A negative (non-negative) value means the segment bandwidth smaller (higher) than the representation bandwidth. A bandwidth of a segment is the sum of an offset value and a representation bandwidth. |
| repeat | | | | Indicates the number of consecutive segments that have the same bandwidth. |

Tables 73 and 74 show syntax of SegmentBandwidth.

TABLE 73

```
<?xml version="1.0" encoding="UTF-8"?>
<xs:schema
targetNamespace="urn:3GPP:ns:PSS:
AdaptiveHTTPStreamingMPD:2009"
   attributeFormDefault="unqualified"
   elementFormDefault="qualified"
   xmlns:xs="http://www.w3.org/2001/XMLSchema"
   xmlns="urn:3GPP:ns:PSS:AdaptiveHTTPStreamingMPD:2009">
......
<!-- Segment access information -->
<xs:complexType name="SegmentInfoType">
   <xs:sequence>
      <xs:element minOccurs="0" name="InitialisationSegmentURL"
type="UrlType"/>
      <xs:choice minOccurs="0">
         <xs:element minOccurs="0" name="UrlTemplate"
         type="UrlTemplateType"/>
         <xs:sequence>
            <xs:element maxOccurs="unbounded"
            name="Url" type="UrlType"/>
            <xs:any namespace="##other"
            processContents="lax" minOccurs="0"
            maxOccurs="unbounded"/>
         </xs:sequence>
```

TABLE 73-continued

```
         <xs:any namespace="##other"
         processContents="lax" minOccurs="0"
            maxOccurs="unbounded"/>
      </xs:choice>
      <xs:element minOccurs="0" name="SegmentBandwidths"
type="SegmentBandwidthsType"/>
   </xs:sequence>
   <xs:attribute name="baseURL" type="xs:anyURI">
   <xs:attribute name="duration" type="xs:duration"/>
   <xs:attribute default="1" name="startIndex" type="xs:unsignedInt"/>
   <xs:anyAttribute namespace="##other" processContents="lax"/>
</xs:complexType>
```

TABLE 74

```
<!-- Segment Bandwidths -->
<xs:complexType name="SegmentBandwidthsType">
   <xs:sequence>
      <xs:element maxOccurs="unbounded"
      name="Range" type="RangeType"/>
      <xs:any namespace="##other"
      processContents="lax" minOccurs="0"
maxOccurs="unbounded"/>
   </xs:sequence>
   <xs:anyAttribute namespace="##other"
   processContents="lax"/>
</xs:complexType>
<xs:complexType name="RangeType">
   <xs:sequence>
      <xs:any namespace="##other"
      processContents="lax" minOccurs="0"
maxOccurs="unbounded"/>
   </xs:sequence>
   <xs:attribute name="offset" type="xs:integer"/>
   <xs:attribute name="repeat" type="xs:unsignedInt"/>
   <xs:anyAttribute namespace="##other"
   processContents="lax"/>
</xs:complexType>
...
</xs:schema>
```

When a long segment causes large fluctuations of a bandwidth within a duration of the segment, it is necessary to describe sub-segment bandwidths. The above description may be implemented by changing the repeat attribute to the duration attribute (type="xs:duration"), to indicate an interval of sub-segments instead of segments.

The above idea may be represented in a more general way using the IntervalBandwidth element, as described below. An advantage of the way may be that an interval is unnecessarily aligned with segment boundaries. In the following syntax, multiple values of minimum initial buffering may be taken into account.

Table 75 shows syntax of IntervalBandwidth.

TABLE 75

| Element or Attribute Name | Use | Description |
|---|---|---|
| Representation | M | Representation element contains description of Representation. |
| ... | | |
| SegmentInfo | 1 | Provides Segment access information. |
| BandwidthInfo | 0 ... N | Provides bandwidth information corresponding to a specific amount of initially buffered media. |

TABLE 75-continued

| Element or Attribute Name | Use | Description |
|---|---|---|
| id | M | Indicates an ID of MinBuffer element of the MPD. If the value of this attribute is 0, the value corresponds to the minimum amount of initially buffered media provided by minBufferTime or minBufferSize attributes of the MPD. |
| repBandwidth | 0 | Provides a bandwidth value for the representation corresponding to the minimum amount of initially buffered media provided in MinBuffer element. The repBandwidth attribute may be absent if the value of id attribute is 0. |
| IntervalBandwidth | 0 ... N | Provides bandwidth information for an interval of the representation. The bandwidth information corresponds to the minimum amount of initially buffered media identified by the id attribute. The first interval may start from the beginning of the representation. |
| offset | M | Indicates a difference between a representation bandwidth and a segment bandwidth. A negative (non-negative) value means the segment bandwidth smaller (higher) than the representation bandwidth. A bandwidth of a segment is the sum of an offset value and a representation bandwidth. |
| duration | M | Indicates duration of the interval. |

Table 76 shows syntax of IntervalBandwidth.

TABLE 76

```
<?xml version="1.0" encoding="UTF-8"?>
<xs:schema targetNamespace="urn:MPEG:ns:DASH"
    attributeFormDefault="unqualified"
    elementFormDefault="qualified"
    xmlns.xs="http://www.w3.org/2001/XMLSchema"
    xmlns.xlink="http://www.w3.org/1999/xlink"
    xmlns="urn:MPEG:ns:DASH">
......
    <xs:complexType name="RepresentationType">
        <xs:complexContent>
            <xs:extension base="RepresentationBaseType">
                <xs:sequence>
                    <xs:element name="SegmentInfo" type="SegmentInfoType"/>
                    <xs:element minOccurs="0" maxOccurs="unbounded" name="BandwidthInfo" type="BandwidthInfoType"/>
                    <xs:element name="TrickMode" type="TrickModeType" minOccurs="0"/>
                </xs:sequence>
                <xs:attribute name="id" type="xs:string" use="required"/>
                <xs:attribute name="bandwidth" type="xs:unsignedInt" use="required"/>
                <xs:attribute name="qualityRanking" type="xs:unsignedInt"/>
                <xs:attribute name="depid" type="StringVectorType"/>
                <xs:attribute name="default" type="xs:boolean"/>
            </xs:extension>
        </xs:complexContent>
    </xs:complexType>
<!-- Bandwidth Info, taken from the above Section    -->
<xs:complexType name="BandwidthInfoType">
    <xs:sequence>
        <xs:element minOccurs="0" maxOccurs="unbounded" name="IntervalBandwidth" type="IntervalBandwidthType"/>
        <xs:any namespace="##other" processContents="lax" minOccurs="0" maxOccurs="unbounded"/>
    </xs:sequence>
    <xs:attribute name="id" type="xs:string"/>
    <xs:attribute name="repBandwidth" type="xs:unsignedInt"/>
    <xs:anyAttribute namespace="##other" processContents="lax"/>
</xs:complexType>
<xs:complexType name="IntervalBandwidthType">
    <xs:sequence>
        <xs:any namespace="##other" processContents="lax" minOccurs="0" maxOccurs="unbounded"/>
    </xs:sequence>
    <xs:attribute name="offset" type="xs:integer"/>
```

TABLE 76-continued

```
<xs:attribute name="duration" type="xs:unsignedInt"/>
<xs:anyAttribute namespace="##other" processContents="lax"/>
</xs:complexType>
...
</xs:schema>
```

Hereinafter, Extension to Support Virtual Segments Will be Described.

Media may be prepared before delivery. In particular, an original media file may be segmented, and several in-band metadata may be inserted into media data.

Description may be given of "virtual segments" that describe different representations, so that a demand for media manipulation may be minimized A virtual segment may be defined as a set of data part(s) inside a stream (or a segment).

Goals of virtual segments may include the following goals 1) and 2):

1) Ease in creation and management of media files: obviously using virtual segments, the number of physical files may be reduced. Additionally, original media files may remain unchanged, and may be augmented by out-of-band signaling metadata.

2) Flexibility in segment provisioning: different types of segments may be obtained from a stream.

In the MPEG DASH, a media segment to be requested by a client may be addressed by a URL and a byte range. The addressing may be rather limited, since a media segment may be formed of different parts of a media stream, in particular when a media stream includes different representations inside. The URL with multiple byte ranges may be used to identify virtual segments. Additionally, different techniques may be used to reduce an increased metadata size caused by using multiple byte ranges.

Semantics of UrlType of the MPD may be changed as follows.

range attribute: [ . . . ]. A format of this string may support multiple byte ranges. (for example, "0-500, 1000-1500")

When decoding a representation obtained by byte ranges, several parts of media header boxes (for example, moov or moof boxes) may include information that is different from representation description. Here, the information may be ignored.

To represent the byte ranges in a compact way, a new element called MoreAddressingInfo may be added. Metadata fragmentation may be applied to the MoreAddressingInfo element, to reduce a size of an initial MPD.

To support the feature that there is no need to modify original media file(s), the segment index boxes (and other related boxes, for example, a box corresponding to a Ranges element) may be conveyed out-of-band. Accordingly, the MoreAddressingInfo element may also include information that includes a URL and byte ranges, for addressing segment index boxes of each media segment.

The SegmentInfo element improved by the MoreAddressingInfo element is described as shown in Table 77.

TABLE 77

| Element or Attribute Name | Use | Description |
|---|---|---|
| SegmentInfo | M | Provide Segment access information. |
| ............ | | |
| UrlList | 0...N | Provides a list of explicit URL(s) for Segments. |
| MoreAddressingInfo | 0...1 | Provides more addressing information for different representations that may be extracted from the segments identified by the above UrlTemplate, Urls, or UrlList. |
| baseURL | O | Provides the base URL for more addressing information. |
| xlink:href | O | Provides reference to external MoreAddressingInfo element. |
| ByteRanges | 0...1 | Provides byte ranges of different representations. |
| xlink:href | | Provides reference to external ByteRanges element. |
| sameRep | O | If sameRep is true, indicates that each Ranges element contains byte ranges of different segments of a representation. If sameRep is false, indicates that each Ranges element contains byte ranges of segments having the same segment order of different representations. The ordering of segments/representations is the same as that in corresponding representation description. If sameRep attribute is absent, which indicates that each Ranges element contains byte ranges for a segment of a representation. The ordering of segments/representations is the same as that in corresponding representation description. When the first representation needs no byte ranges, corresponding Ranges elements for the representation may be absent. |
| Ranges | 0...N | Provides byte ranges of representations (possibly consisting of multiple segments). Ranges element is based on string type representing a sequence of byte ranges. A byte range is denoted by "x-y" where x and y are a start value and an end value. Byte ranges of different segments (if any) are separated by semicolon character (";"), while different byte ranges within a segment are separated by comma character (","). |

TABLE 77-continued

| Element or Attribute Name | Use | Description |
|---|---|---|
| | | When two or more byte ranges corresponding to the same segment order have the same x/y values, one or more x/y values may be absent and then referred from a corresponding value that is present. |
| xlink:href | | Provides reference to external ByteRanges element. |
| IdxBoxes | 0...1 | Provide address of segment index boxes of segments. IdxBoxes element is based on string type representing a sequence of byte ranges. A byte range is denoted by "x-y" where x and y are a start value and an end value. Byte ranges for different segments (if any) are separated by semicolon character (";"), while different byte ranges for a segment are separated by comma character (","). When a segment index box is used out-of-band (i.e., not in a media segment), the reference_offset value of the index box may be referenced from the first byte of the segment. |
| idxFileUrl | O | Provides URL of a file containing the index boxes of the segments. |

Here, conditions may be hold only when xlink:href is not used. When linking is used, all elements may be "optional," and <minOccurs=0>.

Elements are bold, and attributes are non-bold.

Tables 78 and 79 show XML syntax of MoreAddressingInfo.

TABLE 78

```
<!-- Segment access information -->
<xs:complexType name="SegmentInfoType">
  <xs:sequence>
    <xs:element name="InitialisationSegmentURL" type="UrlType" minOccurs="0"/>
    <xs:element name="BaseURL" type="BaseURLType" minOccurs="0" maxOccurs="unbounded"/>
    <xs:element name="SegmentTimeline" type="SegmentTimelineType" minOccurs="0"/>
    <xs:choice minOccurs="0">
       <xs:element name="UrlTemplate" type="UrlTemplateType" minOccurs="0"/>
       <xs:sequence>
         <xs:element name="Url" type="UrlType" maxOccurs="unbounded"/>
         <xs:any namespace="##other" processContents="lax" minOccurs="0"
            maxOccurs="unbounded"/>
       </xs:sequence>
       <xs:element name="UrlList" type="UrlListType" minOccurs="0"/>
       <xs:any namespace="##other" processContents="lax" minOccurs="0"
          maxOccurs="unbounded"/>
    </xs:choice>
    <xs:element name="MoreAddressingInfo" type="MoreAddressingInfoType" minOccurs="0"/>
  </xs:sequence>
  <xs:attributeGroup ref="SegmentInfoAttrGroup"/>
  <xs:anyAttribute namespace="##other" processContents="lax"/>
</xs:complexType>
<xs:complexType name="MoreAddressingInfoType">
  <xs:sequence>
    <xs:element name="ByteRanges" type="ByteRangesType" minOccurs="0"/>
    <xs:element name="IdxBoxes" type="IdxBoxesType" minOccurs="0"/>
  </xs:sequence>
  <xs:attribute ref="xlink:href"/>
  <xs:attribute ref="xlink:actuate" default="onRequest"/>
  <xs:attribute name="baseURL" type="xs:anyURI"/>
  <xs:anyAttribute namespace="##other" processContents="lax"/>
</xs:complexType>
<xs:complexType name="ByteRangesType">
  <xs:sequence>
    <xs:element name="Ranges" type="RangesType" minOccurs="0"
        maxOccurs="unbounded"/>
  </xs:sequence>
  <xs:attribute ref="xlink:href"/>
  <xs:attribute ref="xlink:actuate" default="onRequest"/>
  <xs:attribute name="sameRep" type="xs:boolean"/>
  <xs:anyAttribute namespace="##other" processContents="lax"/>
</xs:complexType>
```

TABLE 79

```
<xs:complexType name="RangesType">
  <xs.simpleContent>
    <xs:extension base="xs:string">
      <xs:attribute ref="xlink:href"/>
      <xs:attribute ref="xlink:actuate" default="onRequest"/>
      <xs:anyAttribute namespace="##other" processContents="lax"/>
    </xs:extension>
  </xs.simpleContent>
</xs:complexType>
<xs:complexType name="IdxBoxesType">
  <xs.simpleContent>
    <xs:extension base="xs:string">
      <xs:attribute name="idxFileUrl" type="xs:anyURI"/>
      <xs:anyAttribute namespace="##other" processContents="lax"/>
    </xs:extension>
  </xs.simpleContent>
</xs:complexType>
```

To further reduce the size of the MoreAddressingInfo element, the MoreAddressingInfo element may be represented by the pseudo-code format.

An example of representing the ByteRanges element in the pseudo-code format is shown in the following Table 80.

TABLE 80

```
aligned(8) class ByteRangesBox extends FullBox('brgb', 0, 0) {
  bit(1)                    same_rep;
  unsigned int(31)          segment_count;
  unsigned int(8)           rep_count;
  if (same_rep){
    for( i=0; i < rep_count; i++)
      for ( j=0; j < segment_count; j++){
        unsigned int(8) range_count;
        for ( k=0; k < range_count; k++){
          unsigned int(32) start;
          unsigned int(32) end;
        }
      }
  }
  if (!same_rep){
    for( i=0; i < segment_count; i++)
      unsigned int(32) segment_offset;
      for ( j=0; j < rep_count; j++){
        unsigned int(7) range_count;
        bit(1) same_start;
        if (!same_start){
          for ( k=0; k < range_count; k++){
            unsigned int(32) start;
            unsigned int(32) end;
          }
        }
        if (same_start){
```

TABLE 80-continued

```
          for ( k=0; k < range_count; k++)
            unsigned int(32) end;
        }
      }
  }
}
```

Here, same_rep indicates whether each sequence of byte ranges below is for segments of the same representation or segments having the same order in different representations.

segment_count indicates the number of segments in each representation.

rep_count indicates the number of representations.

range_count indicates the number of byte ranges.

start and end indicate a start value and an end value of each of byte ranges.

same_start indicates whether the following set of byte ranges has the same start values as a previous set of byte ranges.

To describe characteristics of representations provided by the MoreAddressingInfo element, different ways may be used. Hereinafter, two typical ways will be described: 1) using representations of a representation group and 2) using sub-representations of a representation.

Using Representations of Representation Group

SegmentInfoDefaultType of a RepresentationGroup element may be directly extended from the SegmentInfoType, as shown in the following Table 81. When a SegmentInfoDefault element of the RepresentationGroup element is used to convey addressing information of segments, the SegmentInfo element in the Representation element may be absent. Each representation of the representation group may have the same identifier value as an (corresponding) identifier value indicated by the Ranges element of MoreAddressingInfo.

TABLE 81

```
<xs:complexType name="SegmentInfoDefaultType">
  <xs:complexContent>
    <xs:extension base="SegmentInfoType">
      <xs:attribute name="sourceURLTemplatePeriod" type="xs:string"/>
    </xs:extension>
  </xs:complexContent>
</xs:complexType>
```

Using Sub-Representations in Representation

A new element called SubReps may be used to describe different (sub-) representations of a (parent) representation. The SegmentInfo element of a parent representation (as described above) may be used to convey the addressing information.

Table 82 describes semantics of SubReps.

TABLE 82

| Element or Attribute Name | Use | Description |
| --- | --- | --- |
| Representation | 1 | Provides Segment access information. |
| ............ | | |
| SegmentInfo | 1 | Provides Segment access information. (revised as above) |
| SubReps | 0...1 | Provides information about sub-representations of a representation. |
| SubRep | 0...N | Provides information about a sub-representation of a representation. SubRep element is of RepresentationType. An identifier of the sub-representation may be equal to an identifier of corresponding RepRanges in SegmentInfo element. Attributes of a sub-representation (if present) may override attributes of the parent representation. |

Table 83 shows XML syntax of the SubReps element.

TABLE 83

```
<xs:complexType name="RepresentationType">
    <xs:complexContent>
        <xs:extension base="RepresentationBaseType">
            <xs:sequence>
                <xs:element name="SegmentInfo" type="SegmentInfoType"/>
                <xs:element name="TrickMode" type="TrickModeType" minOccurs="0"/>
                <xs:element name="SubReps" type="SubRepsType" minOccurs="0"/>
            </xs:sequence>
            <xs:attribute name="id" type="xs:string" use="required"/>
            <xs:attribute name="bandwidth" type="xs:unsignedInt" use="required"/>
            <xs:attribute name="qualityRanking" type="xs:unsignedInt"/>
            <xs:attribute name="depid" type="StringVectorType"/>
            <xs:attribute name="default" type="xs:boolean"/>
        </xs:extension>
    </xs:complexContent>
</xs:complexType>
<xs:complexType name="SubRepsType">
    <xs:sequence>
        <xs:element name="SubRep" type="RepresentationType" minOccurs="0" maxOccurs="unbounded"/>
    </xs:sequence>
    <xs:anyAttribute namespace="##other" processContents="lax"/>
</xs:complexType>
```

Hereinafter, an Adaptation Hint Will be Described.

In several cases, measuring quality values may be expensive. Accordingly, instead of explicitly providing quality information, a provider may provide a few hints in selecting different representations.

Hereinafter, an adaptation hint that suggests selected representations in a given context (for example, at a bandwidth constraint of 1 Mbps) is described. Elements and semantics of the adaptation hint are shown below. AdaptationHint may be a child element of Period or Subset. When AdaptationHint is used in SubSet, AdaptationHint may only consider representations that belong to the SubSet.

In practice, a client may use AdaptationHint not only to select representations in described context, but also to infer (for example, interpolate) representations in other possible contexts.

Table 84 shows semantics of AdaptationHint.

TABLE 84

| Element or Attribute Name | Use | Description |
| --- | --- | --- |
| Period | M | Provides information of Period. |
| AdaptationHint | 0...1 | Provides hint to select representations for supporting adaptivity. The hint includes a list of nodes, each describing a given set of constraints (e.g., bandwidth and display size) and the corresponding selected representations. |
| xlink:href | | Provides reference to external AdaptationHint element |
| Node | 1...N | Describes a given context (e.g., bandwidth and display size) and the corresponding selected representations. |
| bandwidth | O | Describes the bandwidth constraint |
| width | O | Describes the width constraint |
| height | O | Describes the height constraint |
| frameRate | O | Describes the frame rate constraint |
| SelectedRep | 1...N | Describes a selected representation. |
| id | M | Describes an identifier of a selected representation. |
| Subset | 0...N | Subset element contains a description of Subset. |
| AdaptationHint | O | Provides hint to select representations for adaptivity. The hint includes a list of nodes, each describing 1) a given set of constraints (e.g., bandwidth and display size) and 2) the corresponding selected representations within SubSet. |

Tables 85 and 86 show syntax of AdaptationHint.

TABLE 85

```
<?xml version="1.0" encoding="UTF-8"?>
<xs:schema targetNamespace="urn:3GPP:ns:PSS:AdaptiveHTTPStreamingMPD:2009"
    attributeFormDefault="unqualified"
    elementFormDefault="qualified"
    xmlns:xs="http://www.w3.org/2001/XMLSchema"
```

TABLE 85-continued

```
xmlns="urn:3GPP:ns:PSS:AdaptiveHTTPStreamingMPD:2009">
<!-- Period of a presentation -->
<xs:complexType name="PeriodType">
    <xs:sequence>
        <xs:element    name="SegmentInfoDefault"    type="SegmentInfoDefaultType" minOccurs="0"/>
        <xs:element    name="Representation"    type="RepresentationType" minOccurs="1" maxOc-curs="unbounded"/>
        <xs:element    name="RepresentationGroup"    type="RepresentationGroupType" minOccurs="0" maxOc-curs="unbounded"/>
        <xs:element    name="Subset"    type="SubsetType"    minOccurs="0" maxOccurs="unbounded"/>
        <xs:element    name="AdaptationHint"    type="AdaptationHintType" minOccurs="0"/>
        <xs:any    namespace="##other"    processContents="lax"    minOccurs="0" maxOccurs="unbounded"/>
    </xs:sequence>
    <xs:attribute ref="xlink:href"/>
    <xs:attribute ref="xlink:actuate" default="onRequest"/>
    <xs : attribute name="start" type="xs:duration"/>
    <xs:attribute name="id" type="xs:string" />
    <xs:attribute name="duration" type="xs:duration"/>
    <xs:attribute    name="segmentAlignmentFlag"    type="xs:boolean" default="false"/>
    <xs:attribute    name="bitStreamSwitchingFlag"    type="xs:boolean" default="false"/>
    <xs:anyAttribute namespace="##other" processContents="lax"/>
</xs:complexType>
<xs:complexType name="SubsetType">
    <xs:sequence>
        <xs:element    name="Contains"    type="ContainsType"    minOccurs="1" maxOccurs="unbounded"/>
        <xs:element    name="AdaptationHint"    type="AdaptationHintType" minOccurs="0"/>
        <xs:any    namespace="##other"    processContents="lax"    minOccurs="0" maxOccurs="unbounded"/>
    </xs:sequence>
    <xs:anyAttribute namespace="##other" processContents="lax"/>
</xs:complexType>
<!-- Adaptation Hint    -->
<xs:complexType name="AdaptationHintType">
    <xs:sequence>
        <xs:element name="Node" type="NodeType" maxOccurs="unbounded"/>
        <xs:any    namespace="##other"    processContents="lax"    minOccurs="0" maxOccurs="unbounded"/>
    </xs:sequence>
    <xs:anyAttribute namespace="##other" processContents="lax"/>
</xs:complexType>
```

TABLE 86

```
<!-- Node    -->
<xs:complexType name="NodeType">
    <xs:sequence>
        <xs:element    name="SelectedRep"    type="SelectedRepType" maxOccurs="unbounded"/>
        <xs:any    namespace="##other"    processContents="lax"    minOccurs="0" maxOccurs="unbounded"/>
    </xs:sequence>
    <xs:attribute name="bandwidth" type="xs:unsignedInt"/>
    <xs:attribute name="width" type="xs:unsignedInt"/>
    <xs:attribute name="height" type="xs:unsignedInt"/>
    <xs:attribute name="frameRate" type="xs:double"/>
    <xs:anyAttribute namespace="##other" processContents="lax"/>
</xs:complexType>
<!-- Selected Rep    -->
<xs:complexType name="SelectedRepType">
    <xs:sequence>
        <xs:any    namespace="##other"    processContents="lax"    minOccurs="0" maxOccurs="unbounded"/>
    </xs:sequence>
    <xs:attribute name="id" type="xs:string" use="required"/>
    <xs:anyAttribute namespace="##other" processContents="lax"/>
</xs:complexType>
</xs:schema>
```

Hereinafter, a Bandwidth Range for a Group of Sub-Representations Will be Described.

Scalable content may be more and more popular due to flexibility in extracting sub-streams to meet various constraints of user devices. A file format may also provide a wide variety of tools to extract sub-streams from a full (scalable) stream. To support scalable content in DASH, a new attribute called bandwidthRange for a Representation may be proposed. The bandwidthRange attribute may provide bandwidth values of sub-streams (or sub-representations) that are extractable from the full stream/representation.

To download the segments of the full representation, a client may use only URLs provided together with representation description. However, to download segments of a sub-representation, the client may include a query parameter called "bandwidth" to each URL (For example, "?bandwidth=1000").

Table 87 describes semantics of bandwidthRange.

TABLE 87

| Element or Attribute Name | Use | Description |
| --- | --- | --- |
| Representation | M | Representation element contains description of Representation. |
| id | M | Describes a unique identifier for Representation within Period. The string may only contain characters permitted to form a valid http-URL according to RFC1738. For scalable content, the string may contain a list of ids (separated by semicolon character ";") corresponding to the sub-representations whose bandwidth values are provided in bandwidthRange attribute. The first id of the list may be an id of the (full) representation. |
| bandwidth | O | Describes a minimum bandwidth of a hypothetical constant bitrate channel in bits per second (bps) over which the Representation (i.e., the collection of all Segments of a Representation) may be delivered such that a client, after buffering for exactly minBufferTime may be assured of having enough data for continuous playout. |
| bandwidthRange | O | Describes a string containing a list of bandwidth values (separated by semicolon character ";") of sub-representations extractable from the representation. To request a sub-representation, a client may include in the request a query parameter called "bandwidth." A value of "bandwidth" is a bandwidth value of the required sub-representation. | bandwidthRange may be used for RepresentationGroup as well. Here, the sub-representations may become representations of RepresentationGroup.

Similarly to the bandwidth, other attributes, such as resolution, or frame rate, may be augmented by corresponding resolutionRange and framerateRange.

Hereinafter, Bandwidth Information Will be Additionally Described.

Description related to a bandwidth and initial buffering delay may be improved to enable flexibility and accuracy in supporting adaptivity.

minBufferTime at MPD Level

A bandwidth value of each representation may be defined with respect to a certain minimum initial buffering time value (minBufferTime). The initial buffering time may be provided at the MPD level. However, it may be unclear whether minBufferTime is applied only to the beginning of the media presentation, or to any RAPs.

Semantics of minBufferTime at the MPD level may be revised to one of the following options:

1) to provide the minimum amount of initially buffered media (at the beginning of the media presentation) that is needed to ensure smooth playout provided that each Representation is delivered at or above the value of the bandwidth attribute of the Representation.

2) to provide the minimum amount of initially buffered media (at the beginning of any Period of the media presentation) that is needed to ensure smooth playout provided that each Representation is delivered at or above the value of the bandwidth attribute of the Representation.

3) to provide the minimum amount of initially buffered media (at any RAPs of the media presentation) that is needed to ensure smooth playout provided that each Representation is delivered at or above the value of the bandwidth attribute of the Representation.

minBufferTime at Period Level

For example, when the minBufferTime attribute at the MPD level is specific to the starting point of the presentation, minBufferTime may be added to each Period. The adding minBufferTime to each Period may override a value of minBufferTime at the MPD level. The overriding may enable appropriate initial buffering before starting a Period.

First, minBufferTime at the MPD level may be changed to an "optional attribute" as shown in Table 88.

Table 88 describes minBufferTime.

TABLE 88

| Element or Attribute Name | Use | Description |
|---|---|---|
| MPD | 1 | Describes a root element that carries a Media Presentation Description (MPD) for a Media Presentation. |
| . . . | | |
| minBufferTime | O | Provides the minimum amount of initially buffered media that is needed to ensure smooth playout provided that each Representation is delivered at or above the value of bandwidth attribute of the Representation. |

Semantics and syntax of the minBufferTime attribute at the Period level are shown in Tables 89 and 90.

TABLE 89

| Element or Attribute Name | Use | Description |
|---|---|---|
| Period | 1 | Provides information of Period. |
| . . . | | |
| minBufferTime | O | Options of semantics: 1) Provides the minimum amount of initially buffered media (at the beginning of the current Period) that is needed to ensure smooth playout provided that each Representation of the current Period is delivered at or above the value of the bandwidth attribute of the Representation. If present, minBufferTime attribute overrides the minBufferTime attribute at MPD level. 1) Provides the minimum amount of initially buffered media (at any RAPs within the current Period) that is needed to ensure smooth playout provided that each Representation of the current Period is delivered at or above the value of the bandwidth attribute of the Representation. If present, minBufferTime attribute overrides the minBufferTime attribute at MPD level. |

TABLE 90

```
<!-- Period of a presentation -->
  <xs:complexType name="PeriodType">
    <xs:sequence>
      <xs:element name="SegmentInfoDefault" type="SegmentInfoDefaultType" minOccurs="0"/>
      <xs:element name="Representation" type="RepresentationType" minOccurs="1" maxOccurs="unbounded"/>
      <xs:element name="RepresentationGroup" type="RepresentationGroupType" minOccurs="0" maxOccurs="unbounded"/>
      <xs:element name="Subset" type="SubsetType" minOccurs="0" maxOccurs="unbounded"/>
      <xs:any namespace="##other" processContents="lax" minOccurs="0" maxOccurs="unbounded"/>
    </xs:sequence>
    <xs:attribute ref="xlink:href"/>
    <xs:attribute ref="xlink:actuate" default="onRequest"/>
    <xs:attribute name="start" type="xs:duration"/>
    <xs:attribute name="id" type="xs:string" I>
    <xs:attribute name="duration" type="xs:duration"/>
      <xs:attribute name="minBufferTime" type="xs:duration" use="optionar>
    <xs:attribute    name="segmentAlignmentFlag"    type="xs:boolean" default="false"/>
    <xs:attribute    name="bitStreamSwitchingFlag"    type="xs:boolean" default="false"/>
    <xs:anyAttribute namespace="##other" processContents="lax"/>
  </xs:complexType>
```

Hereinafter, Revised Definition of the Bandwidth Will be Described.

The definition of the bandwidth may guarantee continuous playout of a representation in a Period. However, there is no guarantee that representation(s) in the next Period (if any) will be sufficiently buffered before representations start. To support continuous playout across Periods, semantics of the bandwidth attribute may be changed as shown in Table 91.

TABLE 91

| Element or Attribute Name | Use | Description |
| --- | --- | --- |
| Representation | M | Representation element contains description of Representation. |
| id | M | Describes a unique identifier for Representation within Period. The string may only contain characters permitted to form a valid http-URL according to RFC1738. |
| bandwidth | M | Describes a minimum bandwidth of a hypothetical constant bitrate channel in bits per second (bps) over which the Representation (i.e., the collection of all Segments of a Representation) may be delivered such that a client, after buffering for exactly minBufferTime may be assured of having enough data for continuous playout. Also, the value of bandwidth may enable 1) transparent splicing between the current Period and the next Period and 2) continuous play-out in the next Period. |

All media data of the current Period may be received well before the start of the next Period. Accordingly, all media data of the next Period may be sufficiently buffered (for continuous playout) before the start of the next Period.

Hereinafter, Multiple Pairs of Bandwidth-minBufferTime Will be Described.

Different devices, receiving the same MPD, may respect minBufferTime in the MPD. However, different devices may require different amounts of initially buffered media (or different minimum initial buffering delays).

For example, one device may prefer low delay (at the cost of high bandwidth), while another device with low-bandwidth connection may accept a large delay.

Having multiple pairs of bandwidth-minBufferTime may provide a great flexibility in selecting QoS levels.

Hereinafter, 1) different values/instances of minBufferTime and 2) different bandwidth values (for each representation) that correspond to different values of minBufferTime will be described. An advantage of such a solution may be that multiple MPDs corresponding to multiple values of minBufferTime are not required.

Accordingly, the schema of MPEG DASH may be changed as follows:

1) More values for minimum initial buffering delay may be added to the MPD.

2) For each representation, bandwidth values corresponding to values of the minimum initial buffering delays may be provided.

The above changes may be implemented by 1) MinBufferTime elements at the MPD level and Period level, and by 2) the BandwidthInfo element in a Representation.

Other pairs of bandwidth-minBufferTime may be interpolated from the provided pairs of bandwidth-minBufferTime.

Table 92 shows semantics of MinBufferTime at the MPD level.

TABLE 92

| Element or Attribute Name | Use | Description |
| --- | --- | --- |
| MPD | 1 | Describes a root element that carries a Media Presentation Description (MPD) for a Media Presentation. |
| ... | | |
| BaseURL | 0 ... N | Describes a URL that may be used on the MPD level, instead of or in addition to baseURL attribute. |
| minBufferTime | 0 ... N | Provides a minimum amount of initially buffered media that is needed to ensure smooth playout. |
| id | M | Provides an ID of MinBuffer element. The value of id attribute may be greater than 0. |
| vaule | O | 1) Provides the minimum amount of initially buffered media (at the beginning of the media presentation) that is needed to ensure smooth playout provided that each Representation is delivered at or above the value of the bandwidth attribute of the Representation. 2) Provides the minimum amount of initially buffered media (at the beginning of any Period of the media presentation) that is needed to ensure smooth playout provided that each Representation is delivered at or above the value of the bandwidth attribute of the Representation. 3) Provides the minimum amount of initially buffered media (at any RAPs of the media presentation) that is needed to ensure smooth playout provided that each Representation is delivered at or above the value of the bandwidth attribute of the Representation. |

Table 93 shows semantics of MinBufferTime at the Period level.

TABLE 93

| Element or Attribute Name | Use | Description |
|---|---|---|
| Period | 1 | Provides information of Period. |
| ... | | |
| minBufferTime | 0 ... N | Provides the minimum amount of initially buffered media that is needed to ensure smooth playout. When MinBufferTime is present, MinBufferTime elements at MPD level are ignored. |
| id | M | Provides an ID of MinBufferTime element. The value of id attribute may be greater than 0. |
| vaule | O | Provides the minimum amount of initially buffered media that is needed to ensure smooth playout provided that each Representation is delivered at or above the value of the bandwidth attribute of the Representation. |

Table 94 shows semantics of BandwidthInfo

TABLE 94

| Element or Attribute Name | Use | Description |
|---|---|---|
| Representation | M | Representation element contains description of Representation. |
| ... | | |
| SegmentInfo | 01 | Provides Segment access information. |
| BandwidthInfo | 0 ... N | Provides bandwidth information corresponding to a specific amount of initially buffered media (provided by minBufferTime attribute or MinBufferTime element). |
| id | 01 | Indicates an ID of MinBufferTime element of the MPD. If the value of id attribute is 0, id attribute corresponds to the minimum amount of initially buffered media provided by minBufferTime attribute. |
| repBandwidth | 0 ... N | Provides a bandwidth value for the representation corresponding to the minimum amount of initially buffered media provided in associated MinBufferTime element. If the value of the id attribute is 0, the bandwidth attribute of the Representation may be used instead of repBandwidth attribute. |

Tables 95 through 97 show syntax of MinBufferTime and BandwidthInfo

TABLE 95

```
<?xml version="1.0" encoding="UTF-8"?>
<xs:schema
targetNamespace="urn:3GPP:ns:PSS:AdaptiveHTTPStreamingMPD:2009"
    attributeFormDefault="unqualified"
    elementFormDefault="qualified"
    xmlns:xs="http://www.w3.org/2001/XMLSchema"
    xmlns="urn:3GPP:ns:PSS:AdaptiveHTTPStreamingMPD:2009">
...
  <xs:complexType name="MPDtype">
    <xs:sequence>
      <xs:element name="ProgramInformation" type="ProgramInformationType" minOccurs="0"/>
      <xs:element name="Period" type="PeriodType" maxOccurs="unbounded"/>
      <xs:element name="BaseURL" type="BaseURLType" minOccurs="0" maxOccurs="unbounded"/>
      <xs:element name="MinBufferTime" type="MinBufferTimeType" minOccurs="0" maxOccurs="unbounded"/>
      <xs:any namespace="##other" processContents="lax" minOccurs="0" maxOccurs="unbounded"/>
    </xs:sequence>
    <xs:attribute name="type" type="PresentationType" default="OnDemand"/>
    <xs:attribute name="availabilityStartTime" type="xs:dateTime"/>
    <xs:attribute name="availabilityEndTime" type="xs:dateTime"/>
    <xs:attribute name="mediaPresentationDuration" type="xs:duration"/>
    <xs:attribute name="minimumUpdatePeriodMPD" type="xs:duration"/>
    <xs:attribute name="minBufferTime" type="xs:duration" use="optional"/>
    <xs:attribute name="timeShiftBufferDepth" type="xs:duration"/>
    <xs:attribute name="baseUrl" type="xs:anyURI"/>
```

TABLE 95-continued

```
    <xs:anyAttribute namespace="##other" processContents="lax"/>
  </xs:complexType>
  <xs:complexType name="MinBufferTimeType">
    <xs:sequence>
      <xs:any namespace="##other" processContents="lax"minOccurs="0"
maxOccurs="unbounded"/>
    </xs:sequence>
    <xs:attribute name="id" type="xs:string" use="required"/>
    <xs:attribute name="value" type="xs:duration"/>
    <xs:anyAttribute namespace="##other" processContents="lax"/>
  </xs:complexType>
```

TABLE 96

```
<!-- Period of a presentation -->
  <xs:complexType name="PeriodType">
    <xs:sequence>
      <xs:element name="SegmentInfoDefault" type="SegmentInfoDefaultType"
minOccurs="0"/>
      <xs:element name="MinBufferTime" type="MinBufferTimeType"
minOccurs="0" maxOccurs="unbounded"/>
      <xs:element name="Representation" type="RepresentationType"
minOccurs="1" maxOccurs="unbounded"/>
      <xs:element name="RepresentationGroup" type="RepresentationGroupType"
minOccurs="0" maxOccurs="unbounded"/>
      <xs:element name="Subset" type="SubsetType" minOccurs="0"
maxOccurs="unbounded"/>
      xs:any namespace="##other" processContents="lax" minOccurs="0"
maxOccurs="unbounded"/>
    </xs:sequence>
    <xs:attribute ref="xlink:href"/>
    <xs:attribute ref="xlink:actuate" default="onRequest"/>
    <xs : attribute name="start" type="xs:duration"/>
    <xs:attribute name="id" type="xs:string"/>
    <xs:attribute name="duration" type="xs:duration"/>
      <xs:attribute name="minBufferTime" type="xs:duration" use="optional"/>
    <xs:attribute           name="segmentAlignmentFlag"         type="xs:boolean"
default="false"/>
    <xs:attribute           name="bitStreamSwitchingFlag"        type="xs:boolean"
default="false"/>
    <xs:anyAttribute namespace="##other" processContents="lax"/>
  </xs:complexType>
. . .
  <xs:complexType name="RepresentationType">
    <xs:complexContent>
      <xs:extension base="RepresentationBaseType">
        <xs:sequence>
          <xs:element name="SegmentInfo" type="SegmentInfoType"/>
          <xs:element         minOccurs="0"          maxOccurs="unbounded"
name="BandwidthInfo" type="BandwidthInfoType"/>
          <xs:element      name="TrickMode"           type="TrickModeType"
minOccurs="0"/>
        </xs:sequence>
        <xs:attribute name="id" type="xs:string" use="required"/>
        <xs:attribute name="bandwidth" type="xs:unsignedInt" use="required"/>
        <xs:attribute name="qualityRanking" type="xs:unsignedInt"/>
        <xs:attribute name="depid" type="StringVectorType"/>
        <xs:attribute name="default" type="xs:boolean"/>
      </xs:extension>
    </xs:complexContent>
  </xs:complexType>
```

TABLE 97

```
<!-- Bandwidth Info-->
  <xs:complexType name="BandwidthInfoType">
  <xs:sequence>
    <xs:any namespace="##other"  processContents="lax"  minOccurs="0"
maxOccurs="unbounded"/>
  </xs:sequence>
  <xs:attribute name="id" type="xs:string"/>
```

TABLE 97-continued

```
<xs:attribute name="repBandwidth" type="xs:unsignedInt"/>
<xs:anyAttribute namespace="##other" processContents="lax"/>
</xs:complexType>
</xs:schema>
```

Hereinafter, Multiple Pairs of Bandwidth-minBufferTime for Each RAP Will be Described.

In general, each RAP of a representation may be provided with multiple pairs of bandwidth-minBufferTime. Such information may enable a client to buffer enough initial data before playing the initial data from a RAP (for example, in the case of random accessing).

Table 98 describes semantics of RAPInfo.

TABLE 98

| Element or Attribute Name | Use | Description |
| --- | --- | --- |
| Representation | M | Representation element contains description of Representation. |
| ... | | |
| SegmentInfo | 1 | Provides Segment access information. |
| RAPInfo | 0 ... 1 | Provides information about bandwidth and initial delay at RAPs of the representation. |
| xlink:href | O | Provides reference to external RAPInfo element. |
| RAPPoint | 1 ... N | Provides pairs of bandwidth and initial delay at a RAP |
| timePoint | M | Provides the time point of the RAP. The time point is relative to the beginning of the representation. |
| BandwidthDelayPair | 1 ... N | Provides a pair of bandwidth and initial delay of the RAP. |
| id | M | Provides the id of the pair. |
| delay | M | Provides a possible initial delay before playout from the RAP. |
| bandwidth | M | Provides bandwidth corresponding to the above delay value. |

Tables 99 and 100 describe syntax of RAPInfo.

TABLE 99

```
<?xml version="1.0" encoding="UTF-8"?>
<xs:schema
targetNamespace="urn:3GPP:ns:PSS:AdaptiveHTTPStreamingMPD:2009"
    attributeFormDefault="unqualified"
    elementFormDefault="qualified"
    xmlns ?xs="http://www.w3.org/2001/XMLSchema"
    xmlns="urn:3GPP:ns:PSS:AdaptiveHTTPStreamingMPD:2009">
    <xs:complexType name="RepresentationType">
        <xs:complexContent>
            <xs:extension base="RepresentationBaseType">
                <xs:sequence>
                    <xs:element name="SegmentInfo" type="SegmentInfoType"/>
                    <xs:element minOccurs="0" maxOccurs="unbounded"
name="BandwidthInfo" type="BandwidthInfoType"/>
                    <xs:element name="TrickMode" type="TrickModeType"
minOccurs="0"/>
                    <xs:element name="RAPInfo" type="RAPInfoType" minOccurs="0"/>
                </xs:sequence>
                <xs:attribute name="id" type="xs:string" use="required"/>
                <xs:attribute name="bandwidth" type="xs:unsignedInt" use="required"/>
                <xs:attribute name="qualityRanking" type="xs:unsignedInt"/>
                <xs:attribute name="depid" type="StringVectorType"/>
                <xs:attribute name="default" type="xs:boolean"/>
            </xs:extension>
        </xs:complexContent>
    </xs:complexType>
```

TABLE 100

```
<xs:complexType name="RAPInfoType">
    <xs:sequence>
        <xs:element name="RAPPoint" type="RAPPointType" minOccurs="0"
maxOccurs="unbounded"/>
    </xs:sequence>
    <xs:attribute ref="xlink:href"/>
</xs:complexType>
```

TABLE 100-continued

```
<xs:complexType name="RAPPointType">
   <xs:sequence>
      <xs:element name="BandwidthDelayPair" type="BandwidthDelayPairType" maxOccurs="unbounded"/>
   </xs:sequence>
   <xs:attribute name="timePoint" type="xs:duration"/>
   <xs:anyAttribute namespace="##other" processContents="lax"/>
</xs:complexType>
<!-- Bandwidth-Delay Pair -->
<xs:complexType name="BandwidthDelayPairType">
   <xs:sequence>
      <xs:any namespace="##other" processContents="lax" minOccurs="0" maxOccurs="unbounded"/>
   </xs:sequence>
   <xs:attribute name="id" type="xs:string"/>
   <xs:attribute name="bandwidth" type="xs:unsignedInt"/>
   <xs:attribute name="delay" type="xs:duration"/>
   <xs:anyAttribute namespace="##other" processContents="lax"/>
</xs:complexType>
</xs:schema>
```

The RAPInfo element and child elements of the RAPInfo element may be converted to pseudo-code format/boxes for compactness. Furthermore, the pseudo-code boxes of the RAPInfo element and child elements of the RAPInfo element may be stored separately or inserted into a media bitstream (for example, in front of each RAP).

Hereinafter, Playout Curve Will be Described.

Providing bandwidth-delay information for each RAP may be costly. Another solution is to represent an approximation of a playout curve of a representation. When the playout curve (or the approximation of the playout curve), and a selected bandwidth (corresponding to a specific initial delay) are known, an initial delay at each RAP may be easily computed as a time offset of a playout curve and a curve representing the selected bandwidth.

Table 101 describes semantics of AppPlayoutCurve.

TABLE 101

| Element or Attribute Name | Use | Description |
| --- | --- | --- |
| Representation | M | Representation element contains description of Representation. |
| ... | | |
| SegmentInfo | 0 ... N | Provides Segment access information. |
| AppPlayoutCurve | 0 ... 1 | Provides a piece-wise approximation curve of the playout curve (i.e., cumulative data size vs. time) of the representation. |
| xlink:href | O | Provides reference to external AppPlayoutCurve element. |
| shift | O | Provides the starting time of the approximation curve. The starting time is relative to the start of the actual playout curve. |
| Interval | 1 ... N | Describes an interval of the approximation curve. |
| datasize | M | Describes the increased data size of the interval. |
| duration | M | Indicates the duration of the interval. |

Table 102 shows syntax of IntervalBandwidth.

TABLE 102

```
<?xml version="1.0" encoding="UTF-8"?>
<xs:schema targetNamespace="urn:MPEG:ns:DASH"
   attributeFormDefault="unqualified"
   elementFormDefault="qualified"
   xmlns:xs="http://www.w3.org/2001/XMLSchema"
   xmlns:xlink="http://www.w3.org/1999/xlink"
   xmlns="urn:MPEG:ns:DASH">
   ...
   <xs:complexType name="RepresentationType">
      <xs:complexContent>
         <xs:extension base="RepresentationBaseType">
            <xs:sequence>
               <xs:element name="SegmentInfo" type="SegmentInfoType"/>
               <xs:element name="AppPlayoutCurve" type="AppPlayoutCurveType" minOccurs="0"/>
               <xs:element name="TrickMode" type="TrickModeType" minOccurs="0"/>
            </xs:sequence>
```

TABLE 102-continued

```
        <xs:attribute name="id" type="xs:string" use="required"/>
        <xs:attribute name="bandwidth" type="xs:unsignedInt" use="required"/>
        <xs:attribute name="qualityRanking" type="xs:unsignedInt"/>
        <xs:attribute name="depid" type="StringVectorType"/>
        <xs:attribute name="default" type="xs:boolean"/>
      </xs:extension>
    </xs:complexContent>
  </xs:complexType>
  <xs:complexType name="AppPlayoutCurveType">
    <xs:sequence>
      <xs:element name="Interval" type="IntervalType" maxOccurs="unbounded"/>
      <xs:any          namespace="##other"  processContents="lax"       minOccurs="0"
maxOccurs="unbounded"/>
    </xs:sequence>
    <xs:attribute ref="xlink:href"/>
    <xs : attribute name="shift" type="xs:duration"/>
    <xs:anyAttribute namespace="##other" processContents="lax"/>
  </xs:complexType>
  <xs:complexType name="IntervalType">
    <xs:sequence>
      <xs:any          namespace="##other"  processContents="lax"       minOccurs="0"
maxOccurs="unbounded"/>
    </xs:sequence>
    <xs:attribute name="datasize" type="xs:unsignedInt"/>
    <xs:attribute name="duration" type="xs:duration"/>
    <xs:anyAttribute namespace="##other" processContents="lax"/>
  </xs:complexType>
</xs:schema>
```

Figure 5:
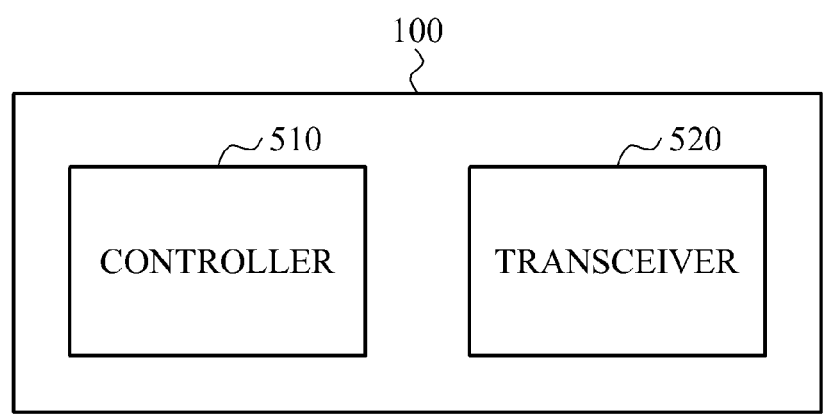
FIG. 5 is a diagram illustrating a configuration of a client 100 according to an embodiment of the present invention.

FIG. 5 is a diagram illustrating a configuration of the client 100 according to an embodiment of the present invention.

A controller 510 may perform operations 130 and 140. Specifically, the controller 510 may process the metadata of the interval.

A transceiver 520 that selects the fragment suitable for the interval based on the processing may perform operations 120, 140, and 150. Specifically, the transceiver 520 may receive the metadata of the interval of the content from the server 110, may send the request for the fragment suitable for the interval to the server, and may receive the fragment from the server.

Figure 6:
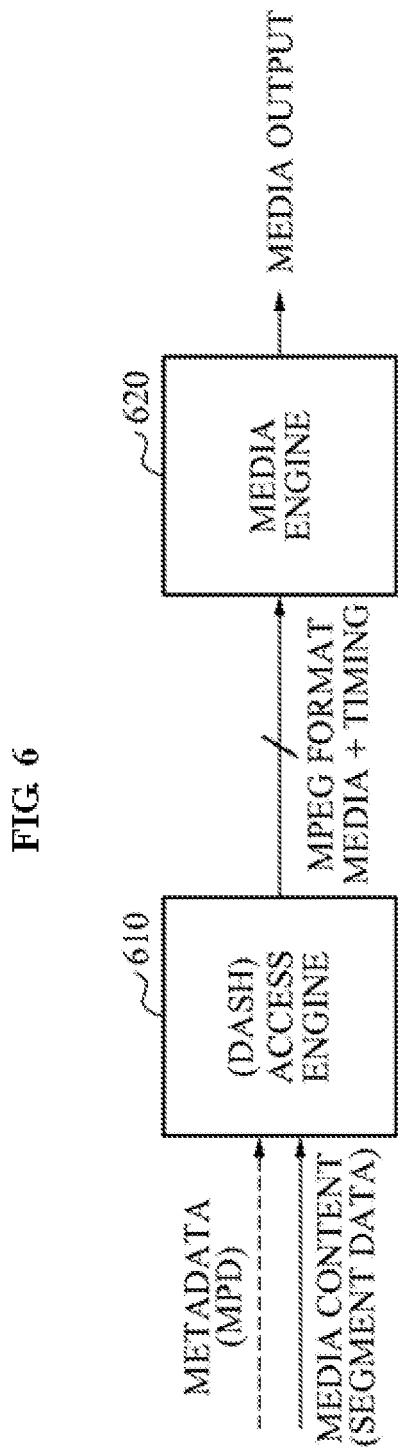
FIG. 6 is a diagram illustrating a configuration of a client 100 according to an embodiment of the present invention.

FIG. 6 is a diagram illustrating a configuration of the client 100 according to an embodiment of the present invention.

The client 100 may include an access engine 610, and a media engine 620.

The access engine 610 may be a DASH access engine.

The access engine 610 may receive metadata (for example, an MPD) from the server 110.

The access engine 610 may form requests, and may issue the formed requests to the server 110.

The access engine 610 may receive content (for example, segments or parts of the segments) from the server 110.

The access engine 610 may provide the content to the media engine 620.

An output of the access engine 610 may include media (or a part of the media) of an MPEG container (for example, an ISO/IEC 14492-12 ISO base media file format, or an ISO/IEC 13818-2 MPEG-2 TS). Additionally, the output of the access engine 610 may include timing information used to map internal timing of the media to a timeline of a media presentation.

The media engine 610 may play back the provided content. Specifically, the media engine 610 may output media using the media and the timing information that are output from the access engine 610.

Technical information according to the embodiments of the present invention described above with reference to FIGS. 1 through 4 may equally be applied to the present embodiment. Accordingly, further description thereof will be omitted.

The method according to the above-described embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for providing media content performed by a processor in a server, the method comprising:
receiving a request for the media content from a client;
transmitting the media to the client based on a Media Presentation Description (MPD) of the media content, wherein the MPD comprises one or more periods,
wherein the period comprises one or more groups,
wherein the group comprises one or more representations,
wherein the representation comprises one or more segments,
wherein the representation includes bandwidth attribute related to bandwidth for a hypothetical constant bitrate channel in bits per second (bps),
wherein the client is assured of having enough data continuously playout after buffering for minbuffertime, when the representation is delivered to the client,
wherein the segment includes sub-segments indexed by segment index,
wherein the MPD includes at least one of (i) frame rate, or (ii) timescale describing the number of time units in one second.

2. The method of claim 1, wherein each of the representations starts from a start time of the period and continues to an ending point of the period.

3. The method of claim 2, wherein the start time of the period is determined below methods,
   i) when a start attribute exists in a first period element of the first period, a start time of the first period is equal to the start attribute,
   ii) when a start attribute does not exist in the first period element of the first period, and when a second period element of the second period includes a duration attribute, the start time of the first period is determined by adding the duration attribute of the second period element to a start time of the second period,
   iii) when a start attribute does not exist in the first period element of the first period, and when the first period is the first of the one or more periods, the start time of the first period is set to 0,
   wherein the second period is previous period with respect to the first period.

4. A server for providing media content, the server comprising:
one or more processor configured to:
receive a request for the media content from a client;
transmit the media to the client based on a Media Presentation Description (MPD) of the media content,
wherein the MPD comprises one or more periods,
wherein the period comprises one or more groups,
wherein the group comprises one or more representations,
wherein the representation comprises one or more segments,
wherein the representation includes bandwidth attribute related to bandwidth for a hypothetical constant bitrate channel in bits per second (bps),
wherein the client is assured of having enough data continuously playout after buffering for minbuffertime, when the representation is delivered to the client,
wherein the segment includes sub-segments indexed by segment index,
wherein the MPD includes at least one of (i) frame rate, or (ii) timescale describing the number of time units in one second.

5. The server of claim 4, wherein each of the representations starts from a start time of the period and continues to an ending point of the period.

6. The server of claim 5, wherein the start time of the period is determined below methods,
   i) when a start attribute exists in a first period element of the first period, a start time of the first period is equal to the start attribute,
   ii) when a start attribute does not exist in the first period element of the first period, and when a second period element of the second period includes a duration attribute, the start time of the first period is determined by adding the duration attribute of the second period element to a start time of the second period,
   iii) when a start attribute does not exist in the first period element of the first period, and when the first period is the first of the one or more periods, the start time of the first period is set to 0,
   wherein the second period is previous period with respect to the first period.

* * * * *

UNITED STATES PATENT AND TRADEMARK OFFICE
CERTIFICATE OF CORRECTION

| | | |
|---|---|---|
| PATENT NO. | : 10,362,130 B2 | Page 1 of 1 |
| APPLICATION NO. | : 15/069443 | |
| DATED | : July 23, 2019 | |
| INVENTOR(S) | : Truong Cong Thang et al. | |

It is certified that error appears in the above-identified patent and that said Letters Patent is hereby corrected as shown below:

On the Title Page

Item (71) Applicants:
Replace "INDUSTRY-UNIVERSITY COOPERATION FOUNDATION KOREA AEROPSACE UNIVERSITY, Goyang-si Gyeonggi-do (KR)" with --INDUSTRY-UNIVERSITY COOPERATION FOUNDATION KOREA AEROSPACE UNIVERSITY, Goyang-si Gyeonggi-do (KR)--

Signed and Sealed this
Tenth Day of September, 2019

Andrei Iancu
*Director of the United States Patent and Trademark Office*